(12) United States Patent
Wang et al.

(10) Patent No.: US 10,118,188 B2
(45) Date of Patent: Nov. 6, 2018

(54) DEVICES FOR DISPENSING SOLID POWDER OR PELLETS

(71) Applicant: Eutomation, Inc., Fremont, CA (US)

(72) Inventors: Xuejun Wang, Pleasanton, CA (US); Xinhua Zong, San Jose, CA (US)

(73) Assignee: Eutomation, Inc., Fremont, CA (US)

( * ) Notice: Subject to any disclaimer, the term of this patent is extended or adjusted under 35 U.S.C. 154(b) by 140 days.

(21) Appl. No.: 14/834,214

(22) Filed: Aug. 24, 2015

(65) Prior Publication Data

US 2017/0057730 A1    Mar. 2, 2017

(51) Int. Cl.
| | |
|---|---|
| *B05B 7/14* | (2006.01) |
| *G01F 13/00* | (2006.01) |
| *B65B 39/00* | (2006.01) |
| *B05B 1/30* | (2006.01) |

(52) U.S. Cl.
CPC .......... *B05B 7/145* (2013.01); *G01F 13/001* (2013.01); *B05B 1/3026* (2013.01); *B65B 39/003* (2013.01)

(58) Field of Classification Search
CPC .......... B65D 83/06; F16L 9/147; G01F 11/24; G01F 13/001; B05B 7/144; B05B 7/145; B05B 7/1404
USPC .... 222/216-248, 145.7, 484, 439, 427, 452, 222/548-555
See application file for complete search history.

(56) References Cited

U.S. PATENT DOCUMENTS

| | | | | |
|---|---|---|---|---|
| 1,520,669 | A * | 12/1924 | Ziegner | B65B 1/12 141/255 |
| 3,101,872 | A * | 8/1963 | Dickinson | G07F 17/0071 221/233 |
| 3,157,313 | A * | 11/1964 | Sarmento | A01K 5/0275 222/482 |
| 4,300,442 | A * | 11/1981 | Martin | A47J 31/44 222/228 |
| 4,322,017 | A * | 3/1982 | Lowdermilk | G01F 11/24 222/217 |
| 4,391,140 | A * | 7/1983 | Reinhard | G01F 11/24 177/50 |
| 4,392,591 | A * | 7/1983 | Fassauer | B65D 88/68 222/227 |
| 4,560,092 | A * | 12/1985 | Souza | G01F 11/24 220/23.4 |
| 4,793,525 | A * | 12/1988 | Kaufmann | G01F 13/001 222/333 |
| 5,275,130 | A * | 1/1994 | Muckler | A01K 5/0233 119/53.5 |

(Continued)

*Primary Examiner* — Charles P Cheyney
(74) *Attorney, Agent, or Firm* — Wong & Rees LLP; Zhichong Gu

(57) ABSTRACT

A drive rod in a solid material dispenser is linearly movable along, and rotationally movable around, an axis direction. A central rod is attached to the drive rod and drivable by the drive rod to rotate around the axis direction with the drive rod. A solid material container has one or more compartments to store solid materials to be dispensed. A switch valve is rigidly attached to the central rod and drivable by the central rod to rotate around the axis direction with the central rod. A container bottom of the solid material container comprises one or more first component shapes that form one or more first interstitial void spaces. The switch valve comprises one or more second component shapes that form one or more second interstitial void spaces.

20 Claims, 19 Drawing Sheets

(56) References Cited

U.S. PATENT DOCUMENTS

| | | | | |
|---|---|---|---|---|
| 5,360,141 | A * | 11/1994 | Scatizzi | B65G 65/4836 |
| | | | | 177/116 |
| 5,934,516 | A * | 8/1999 | Strycharske | A23G 3/28 |
| | | | | 222/158 |
| 6,470,921 | B1 * | 10/2002 | McGregor | B65B 1/12 |
| | | | | 141/12 |
| 7,284,574 | B2 * | 10/2007 | Fontaine | G01G 13/24 |
| | | | | 141/72 |
| 7,793,669 | B2 * | 9/2010 | Farano | A47L 15/4463 |
| | | | | 134/93 |
| 7,980,803 | B2 * | 7/2011 | Brandstatter | B65D 90/585 |
| | | | | 222/485 |
| 8,245,883 | B2 * | 8/2012 | Luchinger | B65B 1/12 |
| | | | | 222/226 |
| 8,393,497 | B2 * | 3/2013 | Fontaine | B65B 1/12 |
| | | | | 141/83 |
| 8,448,817 | B2 * | 5/2013 | Bloechlinger | G01F 13/00 |
| | | | | 141/2 |
| 9,327,850 | B2 * | 5/2016 | Bailey | B65B 1/06 |
| 2010/0282781 | A1 * | 11/2010 | Kinzie | G01F 11/24 |
| | | | | 222/239 |

* cited by examiner

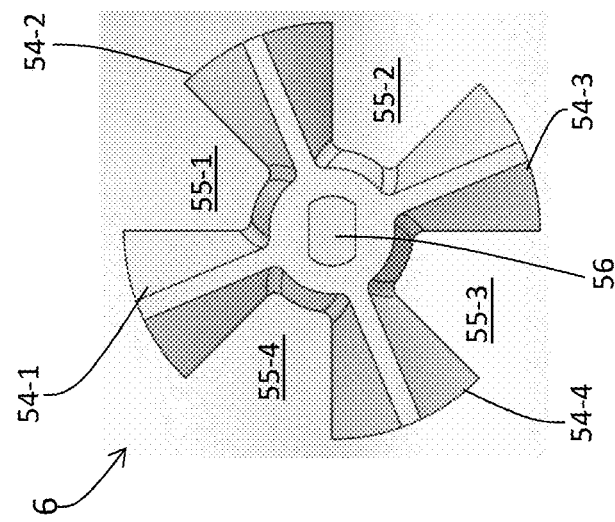
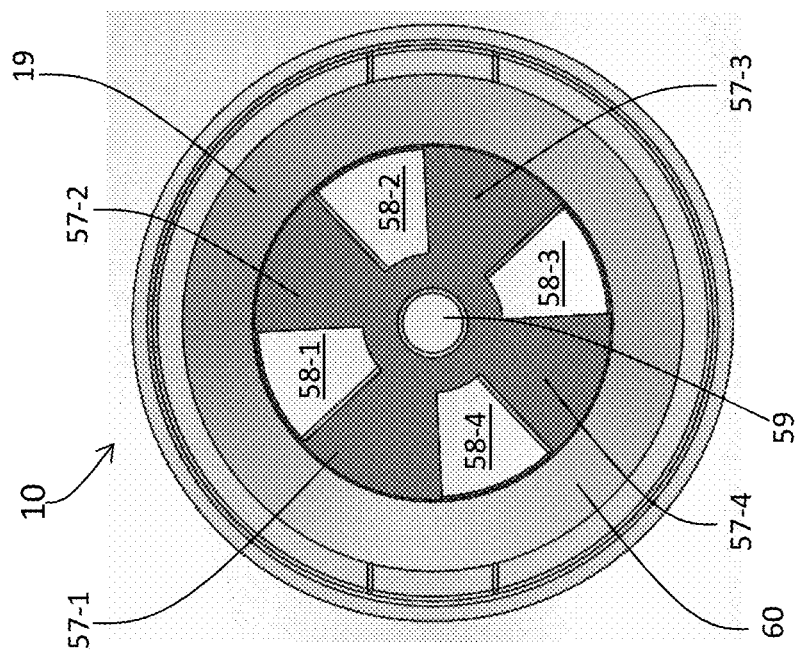
FIG. 3A

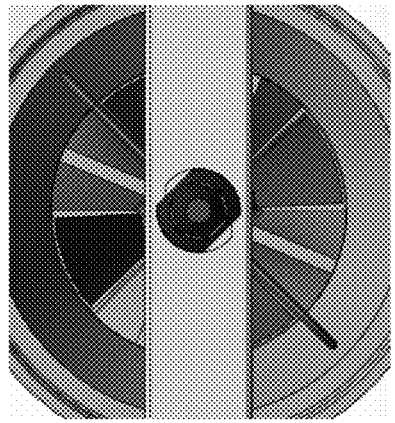
(iii)
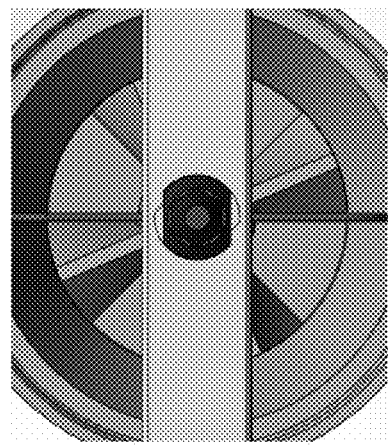
(ii)
FIG. 3B

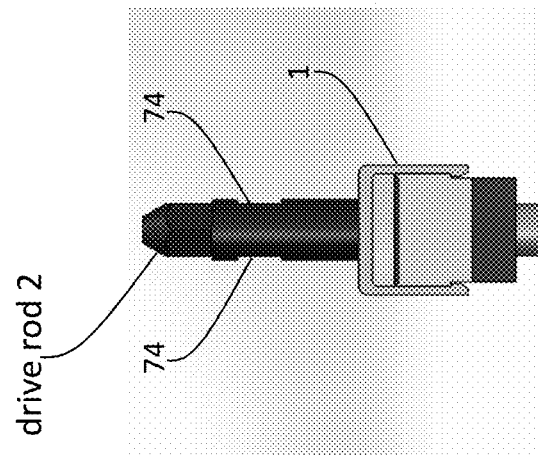
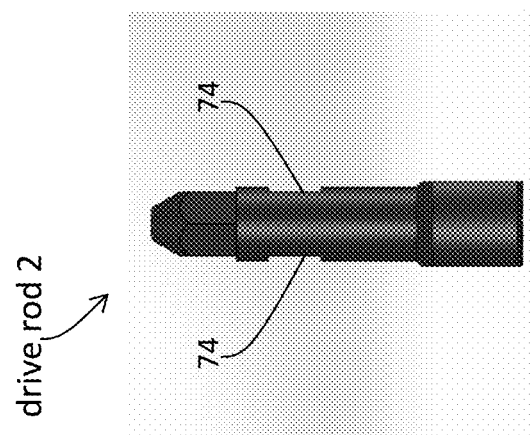
FIG. 3C

DEVICES FOR DISPENSING SOLID POWDER OR PELLETS

TECHNOLOGY

The present invention relates generally to dispensing devices, and in particular, to devices for dispensing solid materials of various granularities including but not limited to powders, pellets, large diameter materials, mixed granularities, etc., in precise amounts.

BACKGROUND

Solid materials can be dispensed with a variety of dispensers. Typically, solid materials in large diameter sizes may be dispensed with dispensers specifically designed to handle large granularity solid materials, whereas solid materials in small diameter sizes may be dispensed with dispensers specifically designed to handle small granularity solid materials.

As an example, solid materials in powdery form may be dispensed with aerosol dispensers. However, it may be challenging for an aerosol dispenser to dispense solid materials in non-powdery form or to dispense powdery materials in accurate amounts.

Alternatively, solid materials may be dispensed with mechanically complex dispensers. Such a dispenser may be expensive to make and to use, as it may comprise a fair number of fragile or delicate parts or components difficult to manufacture and susceptible to malfunction in repeated operations. Because of the fragile or delicate parts and components, it may be extremely difficult to clean the dispenser thoroughly and thus it may be difficult to dispense present solid materials free of pollutions of residues from previously dispensed solid materials of different types.

In addition, a mechanically complex dispenser may still be quite limited in the capability of handling solid materials of a wide range of diameters, such as solid materials of a diameter range larger than a relatively moderate diameter limit. The dispenser may also be limited in the capability of handling solid materials with mixed granularities and/or in relatively large amounts/quantities and/or in relatively minute amounts/quantities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A through FIG. 2K depict example components of a solid material dispenser;

FIG. 3A and FIG. 3B illustrate example operations of a solid material dispenser;

FIG. 3C depicts example views of a drive rod;

DESCRIPTION OF EXAMPLE EMBODIMENTS

Figure 1A:
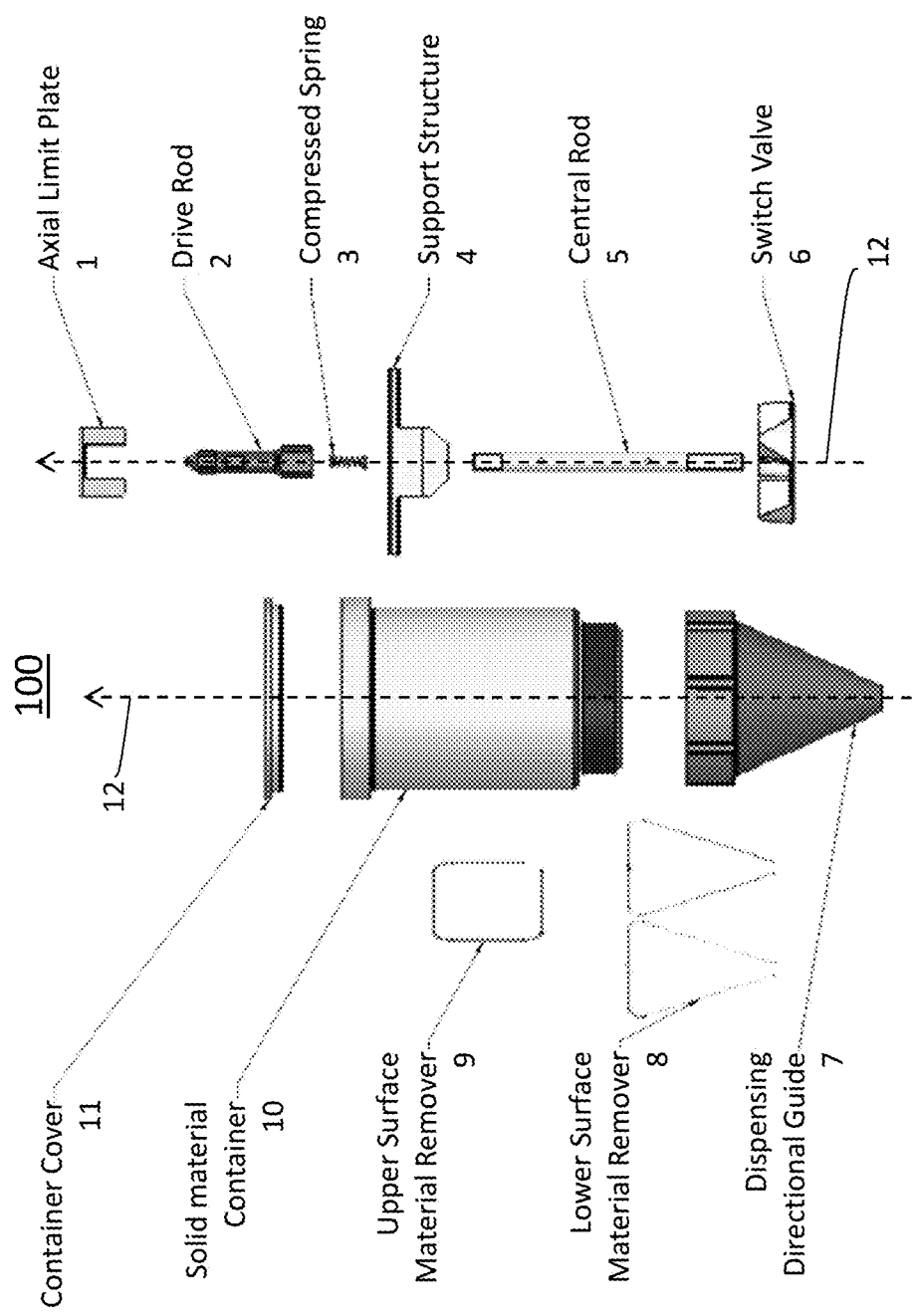
FIG. 1A through FIG. 1C depict an example solid material dispenser.

Example embodiments, which relate to devices for dispensing solid materials of various granularities in precise amounts, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. STRUCTURAL OVERVIEW
3. EXAMPLE DISPENSING OPERATIONS
4. EXAMPLE DISPENSING PLATFORM
5. EXAMPLE EMBODIMENTS
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to rapidly and automatically make accurate distribution/dispensing of solid materials. These techniques can be used to remove severe dispensing capability limits of dispensing devices under other approaches on solid material sizes (e.g., pellet sizes, etc.). The techniques as described herein can be used to easily dispense pellets up to a relatively large diameter size such as greater than three (3) millimeters, five (5) millimeters, ten (10) millimeters, etc., and can be used to adaptively operate with a wide variety of scientific applications, material discovery applications, industrial applications, pharmaceutical applications, etc.

A dispenser or (or dispensing device) as described here may be used to accurately dispense solid materials of one or more of a wide range of different granularity levels such as fine powder, pulverulent particles, pourable particles, pellets, or the like. In some embodiments, the dispenser can be used to dispense solid materials of a uniform size (e.g., a uniform granularity level, a uniform diameter, etc.) to outside receptacles. In some embodiments, the dispenser can be used to dispense solid materials of non-uniform sizes (e.g., non-uniform granularity levels, a mixture/combination of different granularity levels, non-uniform diameters, etc.) to outside receptacles.

The dispenser can be mounted (e.g., temporarily, detachably, permanently, etc.) through one or more of mechanical arms, support structures, external drives, etc., onto a dispensing platform for automatic dispensing of solid materials to a single receptacle, or to an array of receptacles. Additionally, optionally, or alternatively, a dispensing control subsystem can be used to control operational modes and dispensing operations of the dispenser. The dispensing control subsystem may operate in conjunction with a (e.g., digital, electronic, etc.) weight scale (or weight sensor) or the like that monitors, calculates, or otherwise determines, dispensed amount/weight of solid materials in real time or in near real time. Measurements made by the weight scale can be received and processed by the dispensing control subsystem as feedbacks. Based on the measurements received from the weight scale, the dispensing control subsystem, which may be implemented as software, hardware, a combination of software and hardware, etc., can control various dispensing modes and dispensing operations of the dispenser, and other related parts such as one or more mechanic arms, external drives, etc.

In some embodiments, a device for solid material dispensing comprises a drive rod (2) linearly movable along, and rotationally movable around, an axis direction (12); a central rod (5) attached to the drive rod and drivable by the drive rod to rotate around the axis direction with the drive rod; a solid material container (10) having one or more compartments to store solid materials to be dispensed; a switch valve (6) rigidly attached to the central rod and drivable by the central rod to rotate around the axis direction with the central rod. A container bottom (19) of the solid material container comprises one or more first component shapes (57) that form one or more first interstitial void spaces. The switch valve comprises one or more second component shapes (54) that form one or more second interstitial void spaces (55). The one or more second component shapes of the switch valve form a closure with the one or more first component shapes of the container bottom of the solid material container to prevent any of the solid material from being dispensed from the solid material container while the switch valve is positioned at one or more first rotational positions. The one or more second interstitial void spaces form one or more dispensing channels with the one or more first interstitial void spaces to allow one or more units of the solid material to be dispensed from the solid material container to one or more outside receptacles while the switch valve is rotationally positioned differently from the one or more first rotational positions.

In an embodiment, the device further comprises one or more of: a dispensing directional guide (7) comprising an ingress opening to receive the one or more units of the solid materials through the one or more dispensing channels and an egress opening to dispense the one or more units of the drive materials; an axial limit plate (1) to make physical contact with the drive rod, to prevent the drive rod from axial drifting, and to stop the drive rod from being rotated while the drive rod is at a first linear position along the axis direction; a compression spring (3) inserted between the drive rod and the central rod, the compression spring having an upper end that is linearly movable with the drive rod; a support structure (4) secured to the solid material container; an upper surface material remover (9) movable relative to one or more first interior surfaces of the one or more compartments of the solid material container; a lower surface material remover (8) movable relative to one or more second interior surfaces formed between the ingress and egress openings of the dispensing directional guide; a container cover (11) removably secured to the solid material container; etc.

In some example embodiments, mechanisms as described herein form a part of a system, including but not limited to any of: precision dispensers, dosing devices, powder dispensers, pellet dispensers, particle dispensers, single material dispensers, multi-material dispensers, mixed material dispensers, bulk material dispensers, automatic dispensers, computer controlled dispensers, mechanical devices, electromechanical devices, electro-opto-mechanical devices, scientific research instruments, engineering research instruments, lab systems, assembly line systems, medicine dispensing machines, portable dispensers, devices coupled with mechanic arms, devices coupled with drive rods of motors (e.g., electric motors, pneumatic actuators, or the like), dispensers with weight measurement capabilities, dispensers with precision controls on dispensed amounts/quantities, or various other kinds of dispensing devices.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

Figure 1C:
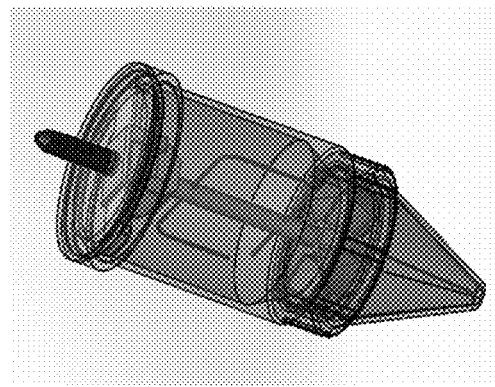
Figure 1B:
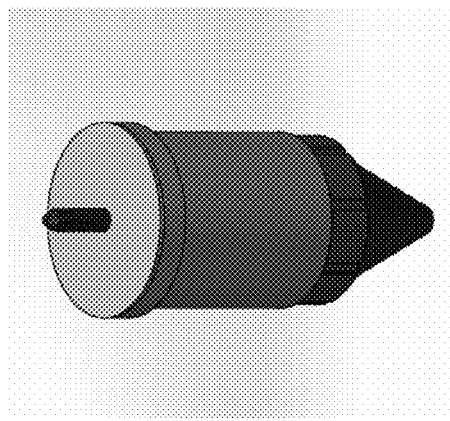

FIG. 1A through FIG. 1C depict an example solid material dispenser (or dispensing device) 100, which comprises an axial limit plate 1, a drive rod 2, a central rod 5, a solid material container 10, a switch valve 6, a dispensing directional guide 7, a support structure 4, etc. FIG. 1A depicts an example component view of the solid material dispenser (100). FIG. 1B and FIG. 1C depicts example perspective views of the solid material dispenser (100).

The solid material container (10) comprises one or more storage compartments (e.g., storage chambers) to store solid materials to be dispensed. The one or more storage compartments may be formed with one or more interior spatial voids (e.g., regions, volumes) inside the solid material container (10) for receiving the to-be-dispensed solid materials. In some embodiments, the solid material container may serve as a reference part for assembling other parts or components into the solid material dispenser (100).

Figure 2A:
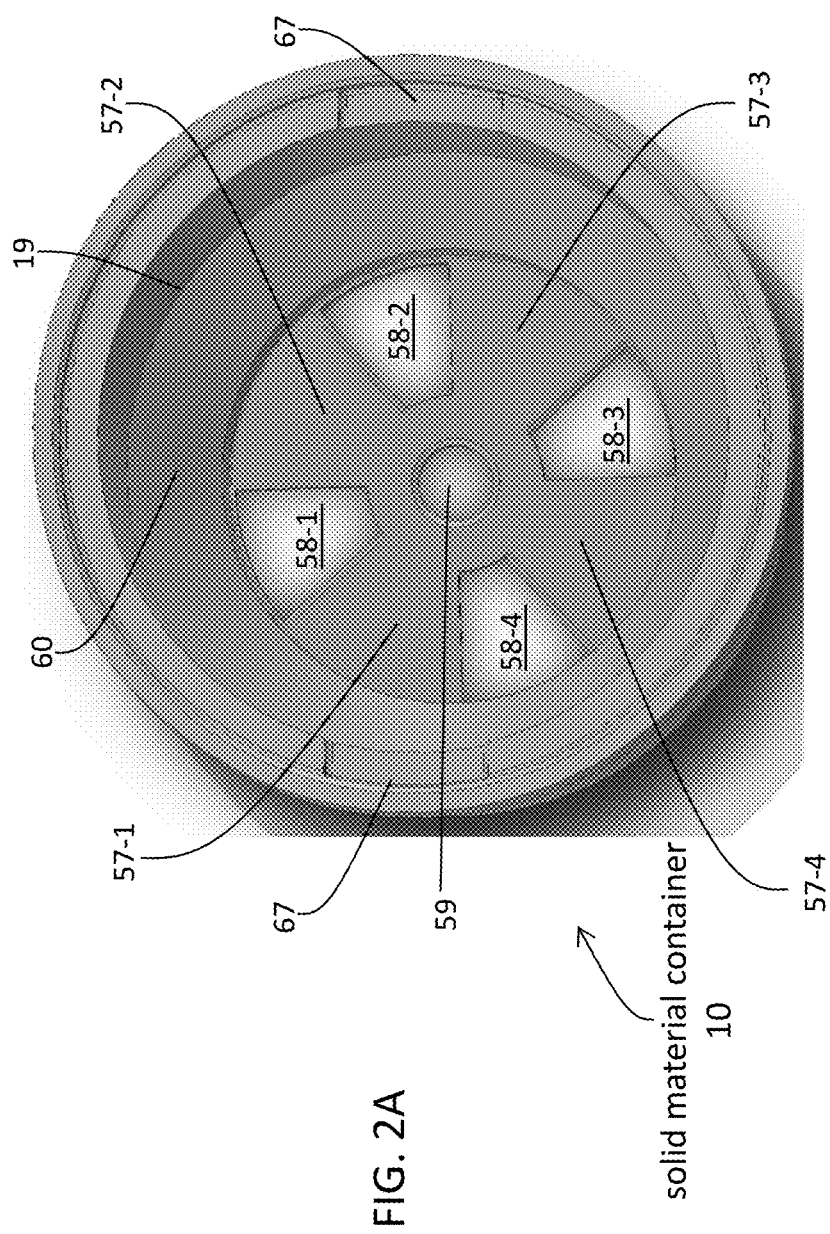

FIG. 2A depicts an example solid material container (e.g., 10 of FIG. 1A), which comprises a container bottom 19. In some embodiments, the switch valve (6) is disposed right above the container bottom (19). The container bottom (19) may, but is not limited to, be a portion of a single rigid structure of the solid material container (10).

As shown in FIG. 2A, the container bottom (19) may comprise a first through hole (59) for the central rod (5) to pass through. The first through hole (59) may be of a (e.g., precisely machined, precisely molded, etc.) lateral shape that allows the central rod (5) to rotate around an rod direction (12) (e.g., an imaginary line) with no or little frictional force or torque exerted on the central rod (5) by the container bottom (19). As used herein, a lateral shape refers to a horizontal shape, a horizontal cross section, a horizontal profile, etc., that is perpendicular (or normal) to the axis direction (12). The central rod (5) is used to transmit rotations from the drive rod (2) to the switch valve (6). When the central rod (5) rotates around the axis direction (12), the rotation of the central rod (5) causes the switch valve (6) to rotate (e.g., correspondingly, identically, etc.) with the central rod (5). In contrast, the container bottom (19) is stationary and does not rotate with the central rod (5) and the switch valve (6).

The container bottom (19) is of a first complex shape comprising a (e.g., rigid, dense, solid, etc.) rim component shape 60 resembling a donut and one or more first component shapes (e.g., 57-1 through 57-4). Each of the first component shapes (57-1 through 57-4) of the container bottom (19) resembles a fan blade. These first component shapes (57-1 through 57-4) form first interstitial void spaces (e.g., 58-1 through 58-4) in between pairs (e.g., 57-1 and 57-2, 57-2 and 57-3, 57-3 and 57-4, 57-4 and 57-1) of neighboring first component shapes in the first component shapes (57-1 through 57-4).

Figure 2B:
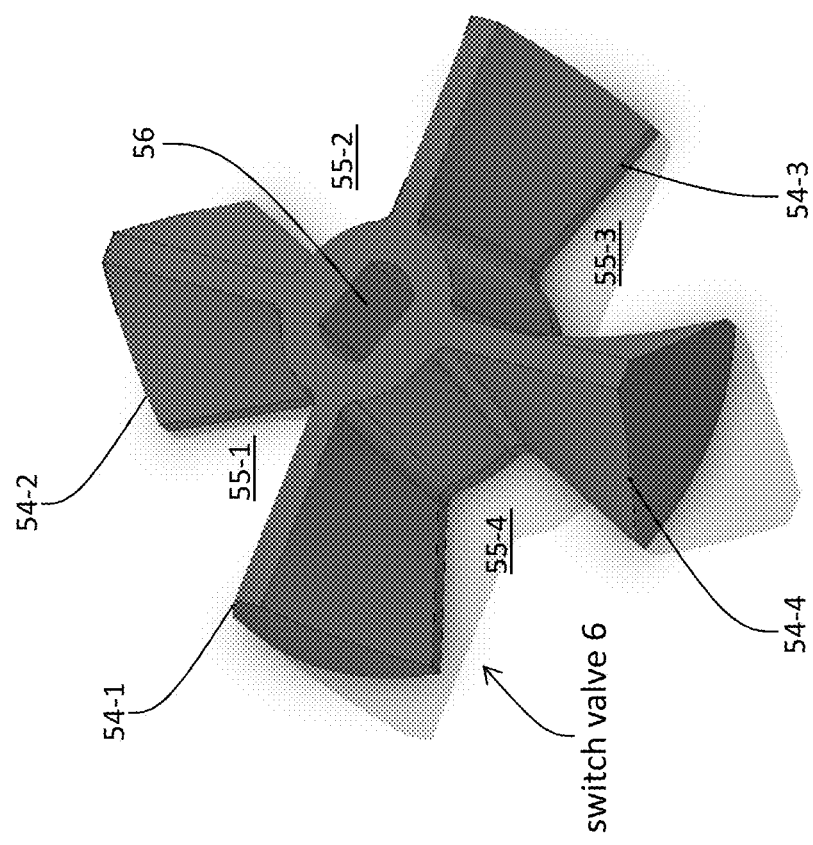
Figure 2C:
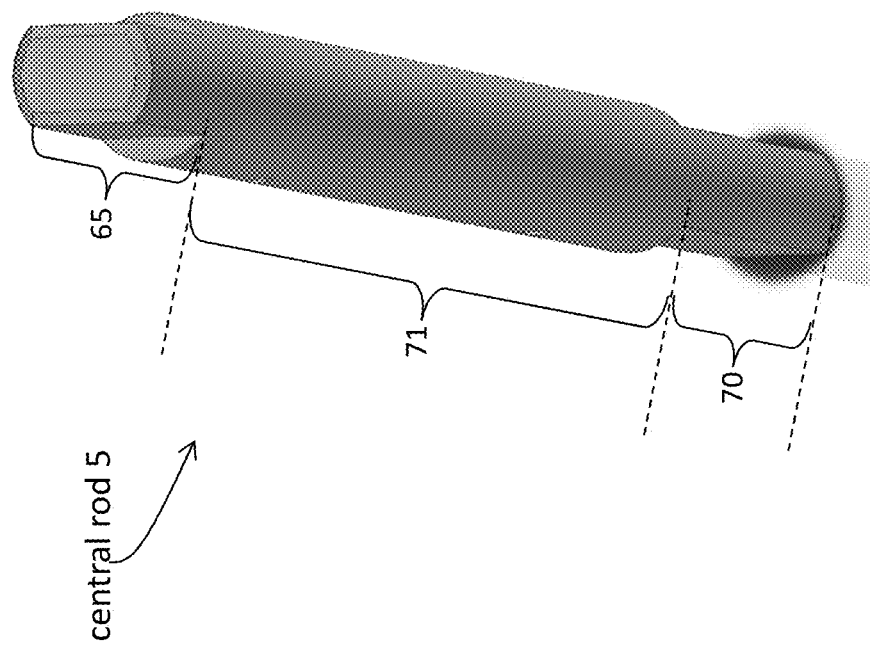

FIG. 2B depicts an example switch valve (e.g., 6 of FIG. 1A) that may be disposed on top of (e.g., right above) a container bottom (e.g., 19 of FIG. 2A) of a solid material container (e.g., 10 of FIG. 1A) as described herein. The switch valve (6) is attached, mounted, or locked (e.g., rigidly, with friction fit, with interference fit, in conjugation, etc.) onto an end section (e.g., 70 of FIG. 2C) of the central rod (5) through a second through hole (56), and is drivable by the central rod (5) to rotate around the axis direction (12) with the central rod (5). The second through hole (56) of the switch valve (6) may be of a first lateral shape (perpendicular to the axis direction (12)) such as a non-circular hole, an elongated hole, a slotted hole, etc., that is tightly fit with a lateral shape of the central rod (5).

When the central rod (5) rotates around the axis direction (12), the central rod (5) exerts rotational force or torque on the switch valve (6) through physical contact/fit in the second through hole (56) between the central rod (5) and the switch valve (6) to cause the switch valve (6) to rotate (e.g., correspondingly, identically, etc.) with the central rod (5).

The switch valve (6) may be a single (e.g., rigid, dense, solid, etc.) contiguous part of a second complex shape such as a fan shape, an arc shape (e.g., less than 180 degrees, 180 degrees, greater than 180 degrees, etc.), a triangular shape, a trapezoidal shape, a curved shape, a regular shape, an irregular shape, a zigzag shape, a symmetric shape, a non-symmetric shape, a planar shape with smooth edges, a planar shape with non-smooth edges, etc. The second complex shape of the switch valve (6) may be at least in part made of one or more second component shapes (e.g., 54-1 through 54-4). For the purpose of illustration only, each of the component shapes (54-1 through 54-4) resembles a fan blade. These second component shapes (54-1 through 54-4) form second interstitial void spaces (e.g., 55-1 through 55-4) in between pairs (e.g., 54-1 and 54-2, 54-2 and 54-3, 54-3 and 54-4, 54-4 and 54-1) of neighboring second component shapes in the second component shapes (54-1 through 54-4).

In a non-dispensing operational mode, the switch valve (6) is at one or more first rotational positions (or angular positions) at which the second interstitial void spaces (e.g., 55-1 through 55-4) of the switch valve (6) and the first interstitial void spaces (e.g., 58-1 through 58-4) of the container bottom (19) does not form (e.g., any) openings or dispensing channels from the solid material container (10) in the solid material dispenser (100) to the dispensing directional guide (7). For example, in any of these first rotational positions, the second interstitial void spaces (e.g., 55-1 through 55-4) of the switch valve (6) may be physically sealed from below by rigid upper surfaces of the first component shapes 57-1 through 57-4 of the container bottom (19), whereas the first interstitial void spaces (e.g., 58-1 through 58-4) of the container bottom (19) may be physically sealed from above by rigid lower surfaces of the second component shapes 54-1 through 54-4 of the switch valve (6).

In a dispensing operational mode, the switch valve (6) is at one or more second rotational positions (or angular positions) other than the first rotational positions. At any of these second rotational positions, at least one or more portions of the second interstitial void spaces (e.g., 55-1 through 55-4) of the switch valve (6) and the first interstitial void spaces (e.g., 58-1 through 58-4) of the container bottom (19) overlap or align, and form openings or dispensing channels to the solid material container (10) in the solid material dispenser (100). For example, in any of the second rotational positions, the second interstitial void spaces (e.g., 55-1 through 55-4) of the switch valve (6) is not (e.g., completely) sealed from below by rigid upper surfaces of the first component shapes 57-1 through 57-4 of the container bottom (19); conversely, the first interstitial void spaces (e.g., 58-1 through 58-4) of the container bottom (19) is not (e.g., completely) sealed from above by rigid lower surfaces of the second component shapes 54-1 through 54-4 of the switch valve (6). The openings or dispensing channels in the dispensing operational mode may be used by the solid material dispenser (100) to dispense one or more spatial volume units of the solid material from the solid material container (10) through the dispensing directional guide (7) to one or more receptacles (e.g., tubes, containers, etc.) outside the solid material dispenser (100).

Figure 2D:
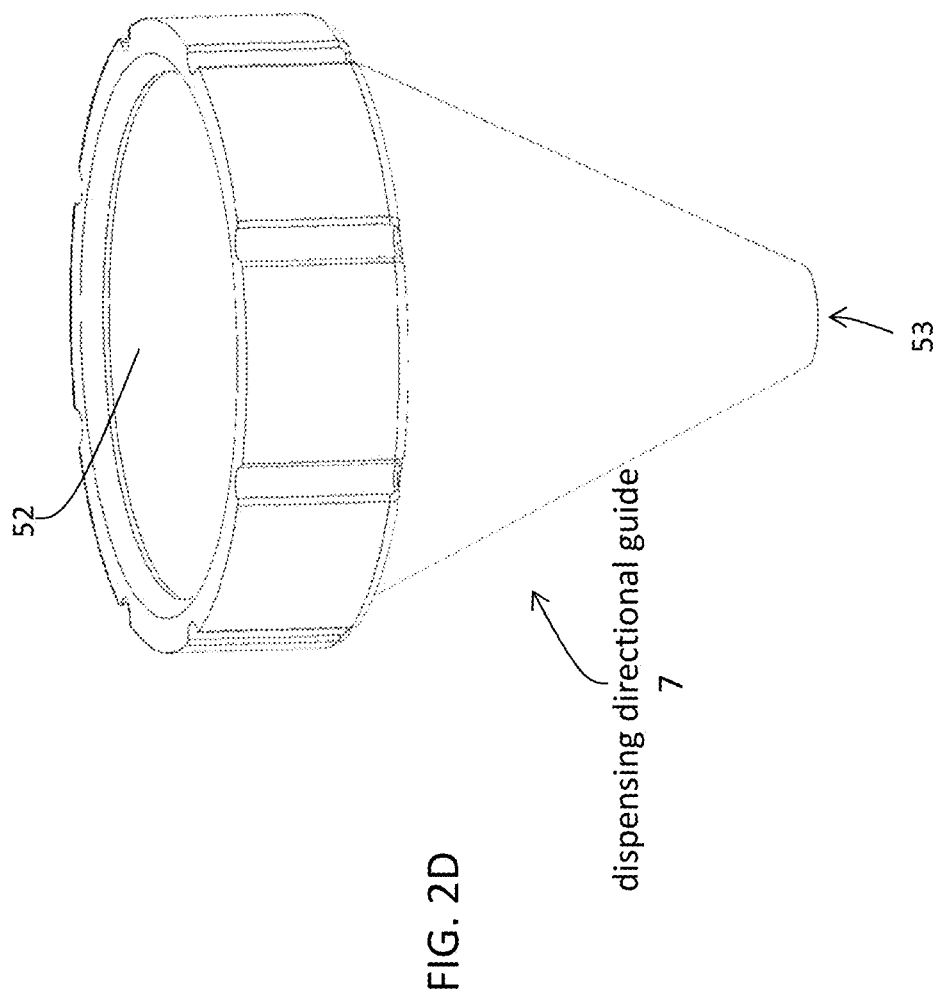

As illustrated in FIG. 2D, the dispensing directional guide (7) may be of a funnel shape or the like, and may comprise an ingress opening (52) to receive one or more spatial volume units of the solid materials from the solid material container (10) through one or more openings or dispensing channels, and an egress opening (53) to dispense the one or more spatial volume units of the solid materials into one or more receptacles (e.g., tubes, containers, etc.) outside the solid material dispenser (100). The dispensing directional guide (7) may be attached or mounted to other parts of the solid material dispenser (100) in any of a multitude of mechanical mechanisms. For example, the dispensing directional guide (7) may be secured with threaded fit (e.g., based on a standard size/interface, based on a proprietary size/interface, exchangeable or replaceable with any of a variety of different dispensing directional guides, etc.) to the solid material container (10). In some embodiments, one or both of the ingress and egress openings (52 and 53) are permanently open, unsealed in either the dispensing or non-dispensing mode. Additionally, optionally, or alternatively, the dispensing directional guide (7) may, but is not required to, comprise meshed structures (e.g., wire meshes), perforated structures, any of a variety of opening sizes, etc.

Figure 2E:
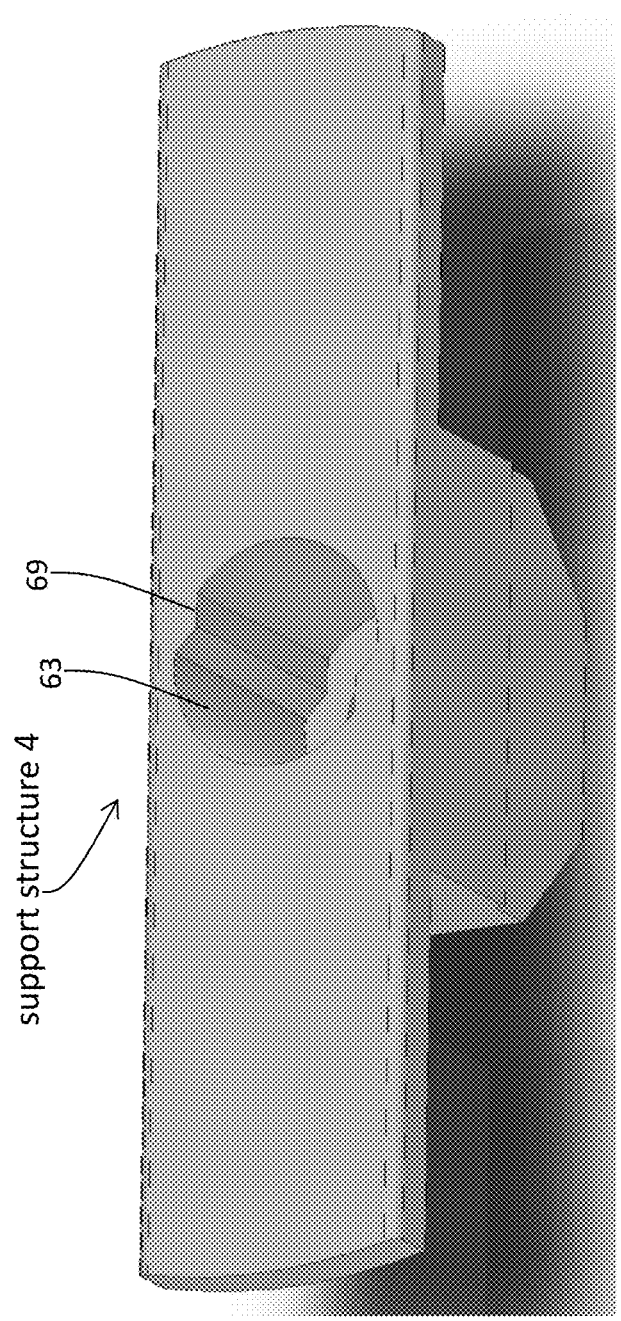

FIG. 2E depicts an example support structure (4) that may be fitted onto the solid material container (10 of FIG. 1A) in the solid material dispenser (100 of FIG. 1A). The support structure (4) may be (e.g., rigidly, with interference fit, etc.) attached, mounted, or otherwise secured, onto the solid material container (10), for example, through fitting into spatial recessions 67 located on the solid material container (10). The support structure (4) comprises an upper cavity 63 to house an end section (e.g., 68 of FIG. 2F) of the drive rod (2). The upper cavity (63) of the support structure (4) may be of a cylindrical shape with a lateral shape (or a cross-sectional shape) that allows the drive rod (2) to rotate around the axis direction (12) in a complete cycle or in a part cycle. In some embodiments, the lateral shape (e.g., a complete circular shape with sufficient clearance, etc.) of the support structure (4) allows the drive rod (2) to rotate (e.g., clockwise, counter-clockwise, repeatedly, back and forth, etc.) in the entire range of 0-360 angular degrees. In some embodiments, in the dispensing operational mode, the drive rod (2) rotates continuously in a single rotational direction such as one of clockwise or counter-clockwise rotational direction. As the drive rod (2) continuously rotates, the container (10) is in close position(s) in some rotational positions and in open position(s) in some other rotational positions. In the non-dispensing operational mode, a pin may be optionally inserted into a cavity in the drive rod (2) or another part of the container (10) to prevent the drive rod (2) from being rotated. In some embodiments, the lateral shape—e.g., a non-circular shape, a ¾ circle, a partial circular shape with flat sections or triangular sections such as 69 of FIG. 2E that are made of or filled with rigid materials, etc.—of the support structure (4) allow the drive rod (2) to rotate only within a sub-range (e.g., 0-180 degrees, 0-90 degrees, 0-45 degrees, 0-30 degrees, etc.) in the range of 0-360 angular degrees. In these embodiments, the lateral shape provides a well-defined start position and a well-defined end position for the rotations of the drive rod (2). The start position may correspond to a close position in which the container (10) is (hermetically) sealed from dispensing materials, while the end position may correspond to an open position in which the container (10) is maximally open for dispensing materials. Additionally, optionally, or alternatively, in the non-dispensing operational mode as in other embodiments, a pin may be optionally inserted into a cavity in the drive rod (2) or another part of the container (10) to prevent the drive rod (2) from being rotated (from the close position). In some embodiments, the support structure (4) comprises a lower cavity spatially connected with the upper cavity (63). The lower cavity of the support structure (4) has a lower-side opening (not shown) to allow an upper portion (e.g., 65 of FIG. 2C) of the central rod (5) to pass through (e.g., with a gap fit, with a precise fit, with no or low friction when the central rod (5) rotates, etc.). As a result, the upper portion (65) of the central rod (5) can be partly inserted through the lower cavity of the support structure (4) into a cavity structure (e.g., 13 of FIG. 2F) of the drive rod (2).

In some embodiments, the drive rod (2) is mechanically coupled with a linearly displaceable external drive shaft (or mechanic arm), and is linearly movable (up and down) along the axis direction (12) under control of the linearly displaceable external drive shaft (or mechanic arm). As used herein, the term "linearly movable along an axis direction" may mean that a physical part such as the drive rod (2) or the like is linearly movable (provided that any existing linear motion constraint such as the axial limit plate 1, a linear movement constraint, etc., is satisfied) along the axis direction (12) or the inverse of the axis direction (12).

The axis direction (12) may represent one or more of a line of symmetry in the solid material container (10), an imaginary line along a longitudinal direction (e.g., a vertical upward direction in FIG. 1A) of the drive rod (2). The axis direction (12) may also coincide (within a manufacturing tolerance or error) with a longitudinal direction of the central rod (5), a longitudinal direction of the compression spring (3), a central direction at which solid materials may be dispensed from the solid materials dispenser (100), etc.

In some embodiments, the drive rod (2) is rotationally movable (provided that any existing rotational motion constraint such as a ¾ circle, a rotational constraint, etc., is satisfied) around the axis direction (12), for example, under control of a rotatable external drive shaft (or mechanic arm) mechanically coupled with the drive rod (2). The rotation of the drive rod (2) may be either left-handed or right-handed with respect to the axis direction (12). As used herein, the term "rotationally movable around an axis direction" may mean that the axis direction (12) represents a rotational axis or the inverse of a rotational axis for rotations of a part such as the drive rod (2).

Figure 2F:
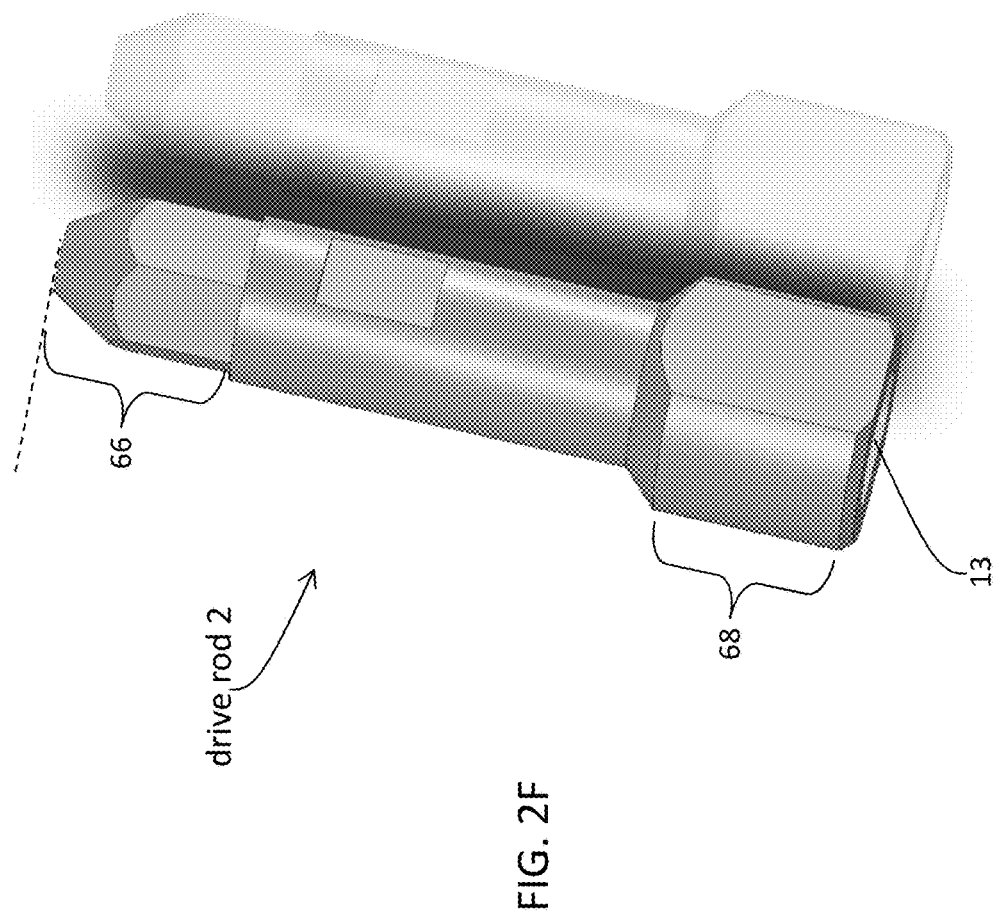

The drive rod (2) is mechanically coupled (e.g., a slotted hole structure, etc.) with the central rod (5) to allow rotational movements to be transmitted from the drive rod (2) to the central rod (5). In some embodiments, the end section (68 of FIG. 2F) of the drive rod (2) may comprise an opening to a (e.g., a uniform, a stepped, etc.) cavity structure (e.g., 13 of FIG. 2F). The cavity structure (13) may be a spatial hollow, a spatial recession, a socket, one or more (contiguous) cylindrical spatial voids, etc., and may be surrounded by (e.g., rigid, solid, dense, etc.) walls with the opening at the bottom of the drive rod (2), as illustrated in FIG. 2F. In some embodiments, the cavity structure (13) may comprise an interior section in the form of a hole (e.g., in a circular shape) to house the compression spring (3), and an exterior section in the form of a slot (e.g., an elongated hole, a slotted hole) into which the upper portion (65 of FIG. 2C) of the central rod (5) with a lateral shape matching or compatible with a lateral shape of the slot can be inserted.

Figure 2G:
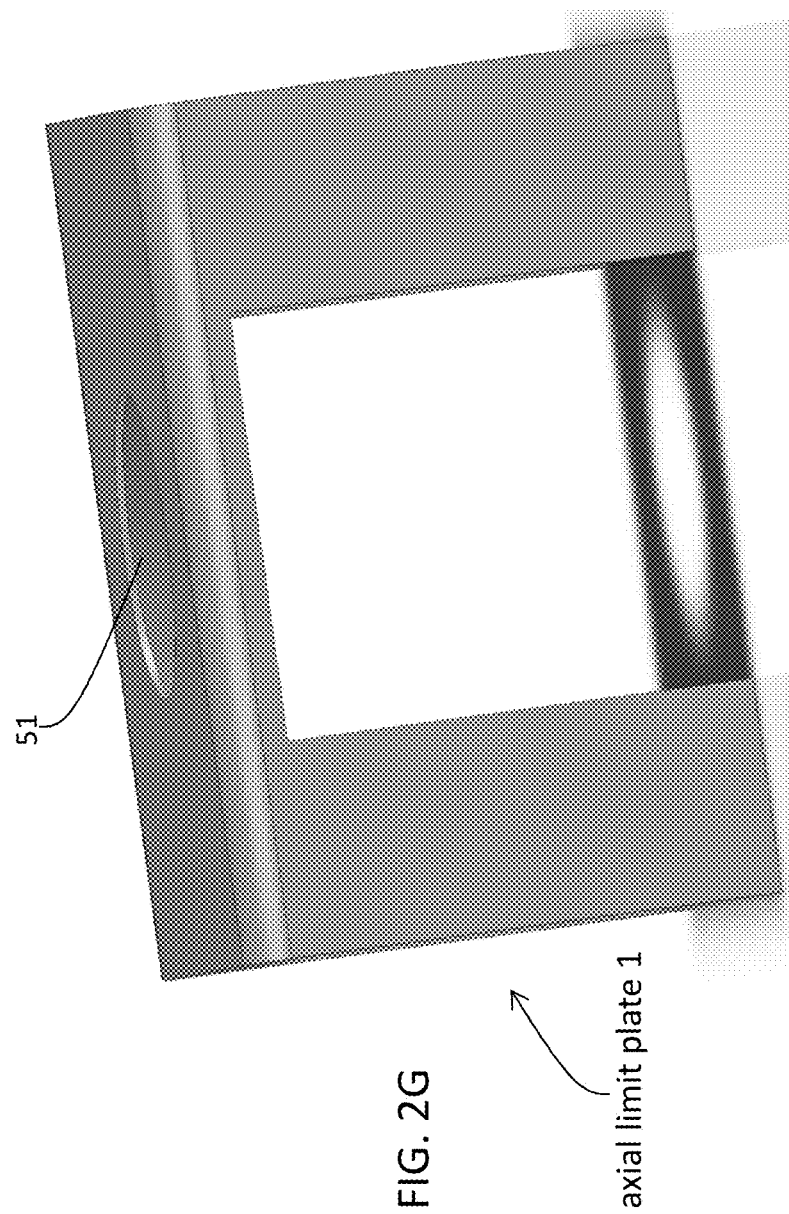

The axial limit plate (1) is installed/mounted (e.g., via a slot structure) on the support structure (4) and can be used to constrain linear motions of the drive rod (2) along the axis direction (12). In the non-dispensing operational mode of the solid material dispenser (100), an upward force exerted by the compression spring (3) on the drive rod (2) causes the drive rod (2) to be in (e.g., physical, tight, frictional, engaged, etc.) contact with the axial limit plate (1). In that operational mode, an upper portion (e.g., 66 of FIG. 2G) of the drive rod (2) may go through, and stay above, an opening (e.g., 51 of FIG. 2G) of the axial limit plate (1). More specifically, the compression spring (3) in the interior hole of the cavity structure (13) exerts the upward force on an upper surface of the cavity structure (13) of the drive rod (2) to cause the drive rod (2) to be at a first linear position at which the upper portion (66) of the drive rod (2) is physically engaged or physically in contact with a rim of the opening (51) on the axial limit plate (1).

As a friction force increases with the increase of a normal force perpendicular to the frictional force, the frictional contact at the first linear position between the axial limit plate (1) and the drive rod (2) may be strengthened or reinforced by an upward force (exceeding the weight of the drive rod (2) in the downward direction) along the axis direction (12) exerted on the drive rod (2) by the compression spring (3). Thus, the frictional contact at the first linear position between the axial limit plate (1) and the drive rod (2) may be used to resist, limit, or even stop, rotations (around the axis direction (12)) of the drive rod (2) at the first linear position.

The axial limit plate (1) can operate in conjunction with the drive rod (2) to prevent axial drifting in the non-dispensing operational mode and to place/maintain the solid material dispenser (100) in the non-dispending operational mode. For example, in the non-dispensing operational mode, the drive rod (2) can be placed in one of the first rotational positions at which positions the solid material dispenser (100) is prevented from dispensing solid materials (e.g., the container bottom (19) and the switch valve (6) form a tight closure to the solid material container (10) at any of the first rotational positions). Because of the physical contact with the axial limit plate (1) in the non-dispensing operational mode, the drive rod (2) is prevented from being rotated away from the first rotational positions. As a result, so long as the drive rod (2) has been placed into the first linear position (or in physical contact with the axial limit plate (1)) and one of the one or more first rotational positions, the solid material dispenser (100) does not dispense solid materials.

In the dispensing operational mode of the solid material dispenser (100), a downward force can be exerted on the drive rod (2) by a movable/rotatable external drive shaft (not shown in FIG. 1A) of a motor (e.g., an electric motor, a pneumatic actuator, or the like) or by a movable/rotatable mechanic arm operationally coupled with an upper portion (e.g., the portion of the drive rod (2) above and through the opening (51) of FIG. 2F) of the drive rod (2) to overcome the upward force exerted by the compression spring (3) on the drive rod (2). The downward force causes the drive rod (2) to be displaced downward along the axis direction (12) and to be physically disengaged from the axial limit plate (1). For example, to transition from the non-dispensing operational mode to the dispensing operational mode, the drive rod (2) can be physically pushed down by the external drive shaft or mechanic arm so that the upper portion of the drive rod (2) is no longer physically engaged or no longer physically in contact with rigid edges of the opening (51 of FIG. 2G) on the axial limit plate (1). Additionally, optionally, or alternatively, the drive rod (2) can be driven to rotate (e.g., left-handedly, right-handedly, with the axis direction 12 as the rotation axis, etc.) away from one of the first rotational positions to one of one or more second rotational positions at which rotational positions the solid material container (10) is no longer sealed by the container bottom (19) and the switch valve (6). At any of these second rotational positions, the solid material dispenser (100) can dispense solid materials in the solid material container (10) through openings or dispensing channels into the dispensing directional guide (7), for example, first into the ingress opening (52 of FIG. 2D) and then to be guided through an egress opening (e.g., 53 of FIG. 2D) to outside receptacles.

In some embodiments, a central rod (5) is attached to the drive rod (2) and is drivable by the drive rod to rotate around the axis direction (12) in synchronization with the drive rod (2). For example, the central rod (5) may be in part inserted into the cavity structure (13) of the drive rod (2). The drive rod (2) can exert rotational force or torque through the portion of the central rod (5) that is inserted into the cavity structure (13) to cause the central rod (5) to rotate with the drive rod (2). Elasticity of the compression spring (3)—which is housed in the cavity structure (13) of the drive rod (2) and inserted between the drive rod (2) and the central rod (5)—allows the drive rod (2) to make linear movements (up and down) along the axis direction (2). The central rod (5) may be linearly immovable, or linearly movable to only a much smaller extent as compared with the linear mobility of the drive rod (2), along the axis direction (2).

For example, the drive rod (2) may be linearly moved along the axis direction (12) from the first linear position at which the drive rod (2) is physically in contact with the axial limit plate (1) to a second linear position at which the drive rod (2) is not physically in contact with the axial limit plate (1). Movements or displacements along the axis direction (12), as made by the drive rod (2), may cause the compression spring (3) to be compressed to small or large extents (proportional to displacements from the equilibrium length if the compression spring (3) has a linear spring constant). External physical forces exerted on the drive rod (2) by an external drive shaft or mechanic arm to effectuate the movements or displacements of the drive rod (2) may be small or large based at least in part on physical properties (e.g., a specific spring constant, a specific displacement from an equilibrium length, etc.) of the compression spring (3) used between the drive rod (2) and the central rod (5). In the dispensing operational mode of the solid material dispenser (100), the compression spring (3) may be of a displacement from the equilibrium length that allows the external drive shaft or mechanic arm to move the drive rod (2) to one or more second linear positions other than (e.g., below) the first linear position for the purpose of disengaging the drive rod (2) from being physically in contact with the axial limit plate (1). At the one or more second linear positions, the drive rod (2) becomes rotatable around the axis direction (12) within a small or large angular range as determined by any rotational constraint, when an external rotational force or torque is applied to the drive rod (2) by the external drive shaft or mechanic arm.

Figure 2H:
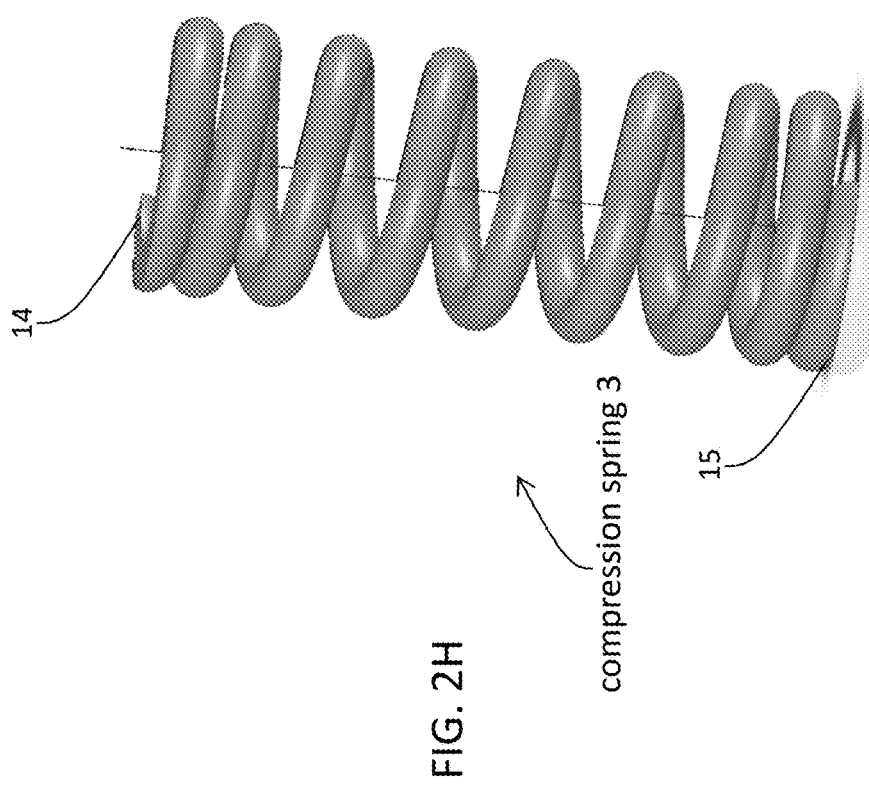
Figure 21:
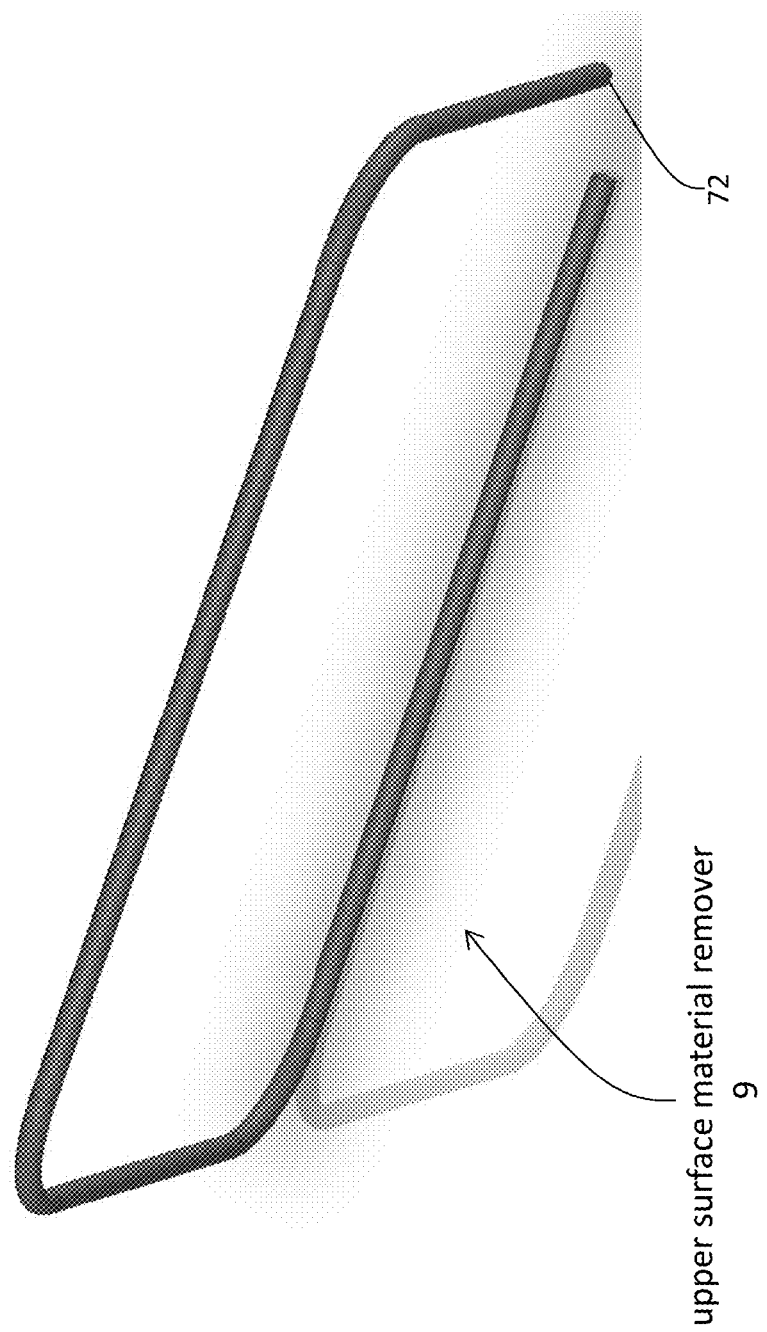

FIG. 2H depicts an example compression spring (3 of FIG. 1A) that may be used in a solid material dispenser (e.g., 100 of FIG. 1A) as described herein. The compression spring (3) may be inserted inside the cavity structure (13) of the drive rod (2) between the drive rod (2) and the central rod (3). The compression spring (3) has an upper end 14 (e.g., in physical contact with the drive rod (2)) that is linearly movable with the drive rod (2) along the axis direction (12), and a lower end 15 (e.g., in physical contact with or on top of the central rod (5)).

In the non-dispensing operational mode, the displacement of the compression spring (3) from its equilibrium length causes the compression spring (3) to exert an upward force to keep the drive rod (2) (e.g., at the first rotational positions and at the first linear position) in physical contact with the axial stop late (1) for the purpose of preventing the drive rod (2) from being rotated and/or linearly moved/displaced to rotational positions and/or linear positions (e.g., at the second rotational positions and/or the second linear positions) other than the first rotational positions and/or the first linear position as mentioned above.

In the non-dispensing operational mode, the displacement of the compression spring (3) from its equilibrium length also causes the compression spring (3) to exert a downward force to keep the switch valve (6) in the first rotational positions at which (a) the second interstitial void spaces (55-1 through 55-4 of FIG. 2A) of the switch valve (6) coincide or align with the first component shapes (57-1 through 57-4 of FIG. 2A) of the container bottom (19), and (a) the first interstitial void spaces (58-1 through 58-4 of FIG. 2A) of the container bottom (19) coincide or align with the second component shapes (54-1 through 54-4 of FIG. 2A) of the switch valve. As a result, the solid material container (10) is physically sealed and prevented from releasing or dispensing solid materials in the solid material container (10) through the dispensing directional guide (7).

In some embodiments, the central rod (5) and the switch valve (6) are manufactured as separate parts, and are (e.g., rigidly, etc.) attached with each other. In some other embodiments, the central rod (5) and the switch valve (6) may be manufactured as a single contiguous part (e.g., by 3D printing technologies, etc.).

The central rod (5) and the switch valve (6) may have no or little relative motions such as relative linear motions, relative rotations, etc., between each other. As the central rod (5) is driven by the drive rod (2) to rotate, the switch valve (6) is driven by the central rod (5) to perform the same motions (e.g., the same rotations) performed by the central rod (5).

FIG. 2I depicts an upper surface material remover (9) that may be used to remove surface materials accumulated on first interior surfaces of one or more storage compartments in a solid material container (e.g., 10 of FIG. 1A) as described herein. In some embodiments, the upper surface material remover (9) comprise one or more of physical wire frames, wire frames with brushes, wire meshes, etc. The upper surface material remover (9) may be (e.g., permanently, temporarily, detachably, etc.) attached to the central rod (5), for example, by inserting an end (e.g., 72 of FIG. 2I) of the upper surface material remover (9) through a mounting hole in a middle section (e.g., 71 of FIG. 2C) of the central rod (5) located in the storage compartments of the solid material container (10). The rotational movement of the central rod (5) may be transmitted to the upper surface material remover (9) to cause the upper surface material remover (9) to rotate and sweep through one or more portions of the first interior surfaces of the storage compartments in the solid material container (10). Contour surfaces formed by the upper surface material remover (9) in its rotational movement may (e.g., tightly, etc.) follow, match or fit with some or all of the first interior surfaces of the solid material container (10). Based on a clearance gap between contour surfaces formed by the rotation of the upper surface material remover (9) and the first interior surfaces of the storage compartments, solid material clusters (e.g., clumps, etc.) with diameters or linear dimensions greater than the clearance gap may be prevented from being formed on the first interior surfaces. Additionally, optionally, or alternatively, the upper surface material remover (9) may comprise meshed structures (e.g., wire meshes), perforated structures, etc., to break down large solid material clusters that may be formed inside the storage compartments of the solid material container (10) at, near or even away from the first interior surfaces.

Figure 2J:
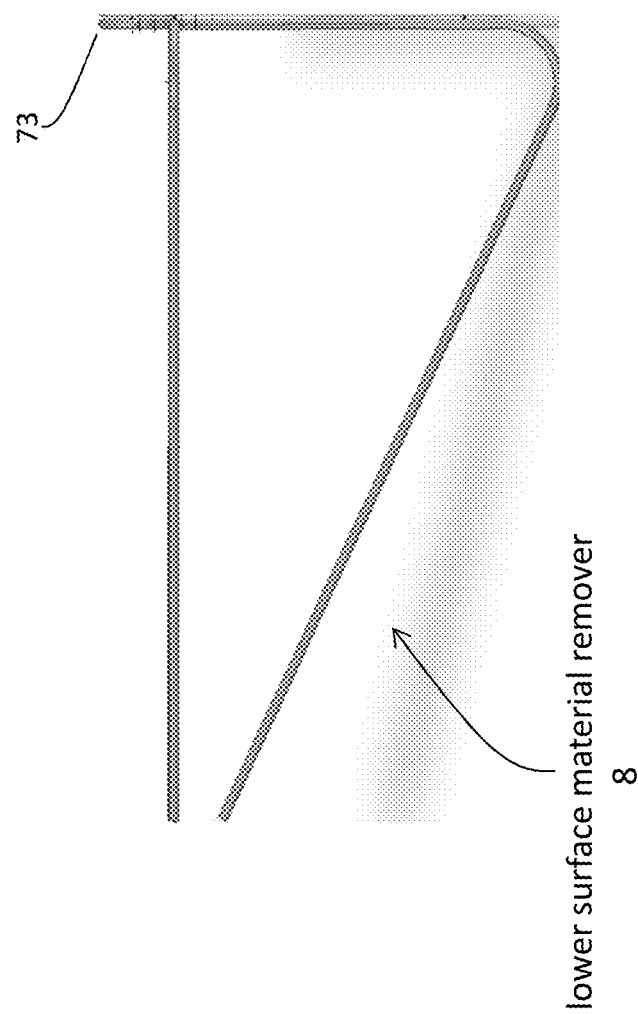

FIG. 2J depicts a lower surface material remover (8) that may be used to remove surface materials accumulated on second interior surfaces of a dispensing directional guide (e.g., 7 of FIG. 1A) as described herein. In some embodiments, the lower surface material remover (8) comprise one or more of physical wire frames, wire frames with brushes, wire meshes, etc. The lower surface material remover (8) may be (e.g., permanently, temporarily, detachably, etc.) attached to the central rod (5), for example, by inserting an end (e.g., 73 of FIG. 2J) of the lower surface material remover (8) through a mounting hole in the end section (70 of FIG. 2C) of the central rod (5) protruding out from the container bottom (19) of the solid material container (10). The rotational movement of the central rod (5) may be transmitted to the lower surface material remover (8) to cause the lower surface material remover (8) to rotate and sweep through one or more portions of the second interior surfaces in the dispensing directional guide (7). Contour surfaces formed by the lower surface material remover (8) in its rotational movement may (e.g., tightly, etc.) follow, match or fit with some or all of interior surfaces of the dispensing directional guide (7). Based on a clearance gap between the contour surfaces formed by the rotation of the lower surface material remover (8) and the second interior surfaces of the dispensing directional guide (7), solid material clusters with diameters or linear dimensions greater than the clearance gap may be prevented from being formed on the second interior surfaces. Additionally, optionally, or alternatively, the lower surface material remover (8) may comprise parts and components (e.g., wire meshes) to break down large solid material clusters that may be formed inside the dispensing directional guide (7) at, near or even away from the second interior surfaces.

Figure 2K:
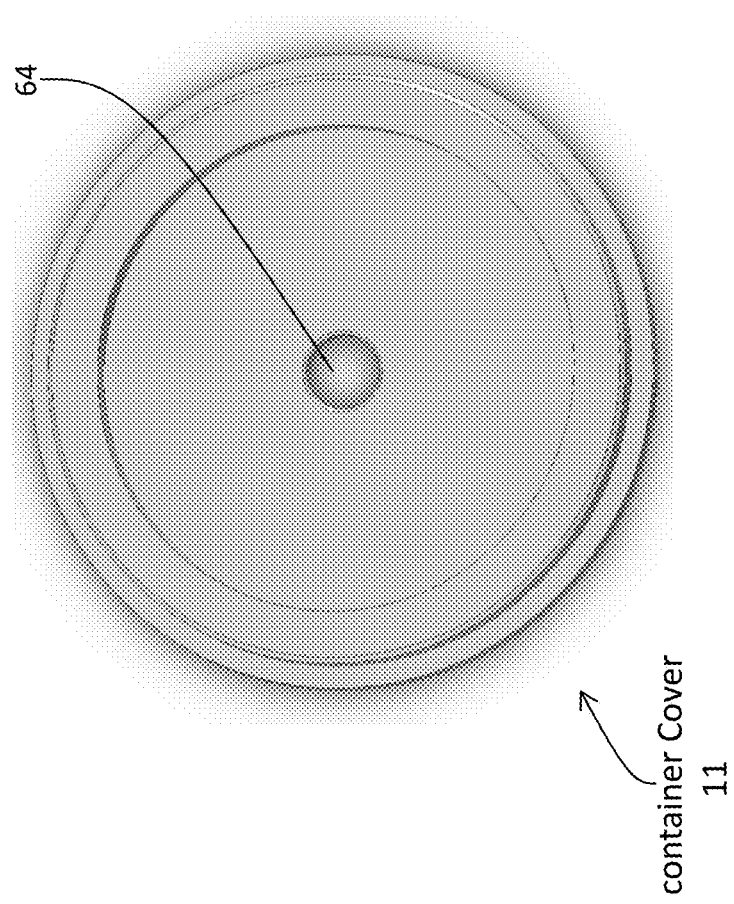

FIG. 2K depicts a container cover (11) that may be used to as a top cover of a solid material container (e.g., 10 of FIG. 1A) as described herein. The container cover (11) may be disposed above the support structure (4), and attached or otherwise secured to the solid material container (10) in any of a variety of mechanism. For example, the container cover (11) may be (e.g., removably, detachably, with gap fit, with interference fit, etc.) secured to the solid material container (10) with a threaded fit. The container cover (11) may comprise an opening 64) that fits (e.g., precisely, smoothly, etc.) with a cylindrical section of the drive rod (2). The container cover (11) seals the solid material container (10) from the top so that moistures, pollutions, other materials, etc., do not inadvertently get inside the storage compartments of the solid material container (10).

For the purpose of illustration, it has been described that a central rod may be coupled with a drive rod through a slot located in the drive rod. It should be noted that in various embodiments, a drive rod and a central rod as described herein may be mechanically coupled with each other through a different coupling mechanism other than a slot located in a drive rod. For example, instead of a drive rod containing a slot, a central rod as described herein may contain a slot (e.g., a hollow, a socket, a cylindrical void portion surrounded by solid walls, housing a compression spring, etc.) into which the drive rod may be at least partly inserted for the purpose of transmitting rotations from the drive rod to the central rod.

3. Example Dispensing Operations

FIG. 3A and FIG. 3B illustrate example operations of a solid material dispenser (e.g., 100 of FIG. 1A) as described herein. As illustrated in FIG. 3A, each first interstitial void spaces (e.g., 58-1, etc.) of the first interstitial void spaces (58-1 through 58-4) formed in between the first component shapes (57-1 through 57-4) of the first complex shape of the container bottom (19) may correspond to a respective second component shape (e.g., 54-1, etc.) of the second component shapes (54-1 through 54-4) of the second complex shape of the switch valve (6).

In the non-dispensing operational mode, the switch valve (6) is at one of the one or more first rotational positions at which the first interstitial void spaces (58-1 through 58-4) of the container bottom (19) spatially align (or overlap) with their respective second component shapes (54-1 through 54-4) of the switch valve (6). As a result, the solid material container (10) is sealed; and solid materials in the storage compartments of the solid material container (10) is prevented from descending, flowing or being poured out of the solid material container (10).

In the dispensing operational mode, the first interstitial void spaces (58-1 through 58-4) of the container bottom (19) no longer spatially align (or no longer overlap) with their respective second component shapes (54-1 through 54-4) of the switch valve (6) and no longer form a complete closure at the underside of the solid material container (10). As a result, the solid material container (10) is not sealed; and the first interstitial void spaces (58-1 through 58-4) of the container bottom (19) overlap at least in part with the second interstitial void spaces (55-1 through 55-4) of the switch valve (6). Some or all of solid materials (e.g., solid pellets, powders, etc.) in the storage compartments of the solid material container (10) descend, flow, or are poured out of the solid material container (10) through openings or dispensing channels formed by the overlapped first and second interstitial void spaces (58-1 through 58-4 and 55-1 through 55-4) to the solid material container (10). The flow rate of the solid materials flowing out of the solid material container (10) can be controlled based at least in part on controlling rotational angles (or angular displacements) of the switch valve (6), which determine cross sectional area sizes of the openings or dispensing channels to the solid material container (10). Additionally, optionally, or alternatively, the flow rate of the solid materials flowing out of the solid material container (10) can be controlled based at least in part on controlling the open/close frequency (e.g., how frequent dispensing channels are in open/close positions) of the switch valve (6), which determine cross sectional area sizes of the openings or dispensing channels to the solid material container (10).

In the non-dispensing operational mode, the compression spring (3) presses the drive rod (2) tightly against the axial limit plate (1) (e.g., the rim of the opening (51 of FIG. 2G)). At the same time, the compression spring (3) also presses, through the central rod (5), the switch valve (6) down tightly against the container bottom (19) of the solid material container (10). Frictional surface contact, or alternatively smooth (e.g., frictionless, with little friction, etc.) but tight surface contact, between the switch valve (6) and the container bottom (19) causes the solid material container (10) to be in a closed state. In some embodiments, because of downward spring force (or tension) exerted by the compression spring (3), lower surfaces of the switch valve (6) is tightly or sealingly coupled with coplanar upper surface of the container bottom (19) to prevent solid materials in the solid material container (10) from leaking out of the solid material dispenser (100) through any gaps between the switch valve (6) and the container bottom (19).

To transition from the non-dispensing operational mode to the dispensing operational mode, an external driving shaft (or a mechanic arm) that is couple to the drive rod (2) exerts a downward force on the drive rod (2) to overcome the upward spring force of the compression spring (3) exerted on the drive rod (2), causes the drive rod (2) to disengage from physical contact with the axial limit plate (1), and rotate the switch valve (6) away from the first rotational positions to form the openings or dispensing channels to the solid material container (10).

The compression spring (3) can be designed to ensure that, in the non-dispensing operational mode, the initial tension (preload tension) is greater than the weight (or gravitational force opposite to the axis direction (12)) of the drive rod (2), for example, with a residual amount of tension to press the drive rod (2) upward tightly against the axial limit plate (1) and to press (through the central rod (5)) the switch valve (6) downward tightly against the container bottom (19) of the solid material container (10) to maintain frictional contact between the switch valve (6) and the container bottom (19). On the other hand, in order to lessen workloads on the external driving mechanism, the designated preload tension of the compression spring (3) should not be too large to require the external driving mechanism to exert an unnecessarily large external drive force for the purpose of disengaging and keeping the drive rod (2) away from the axial limit plate (2).

The switch valve (6) may comprise a specially shaped structure with a relatively small lateral shape at the top increasing to a relatively large lateral shape at the bottom. In a non-limiting implementation example, the topside of the switch valve (6) is of thin elongated rectangles, which extend or graduate downward to a wider fan blade shape at the underside of the switch valve (6). The relatively small lateral shape of the switch valve (6) at the top provides only very small horizontal areas and causes solid materials to fall mostly into the second interstitial void spaces (55-1 through 55-4) rather than to stay at the top of the switch valve (6). A relatively small portion of the solid materials that does fall on top of the switch valve (6) can be dislocated from there by rotational motions of the switch valve (6) and eventually can be shaken off into the second interstitial void spaces (55-1 through 55-4). The solid materials inside the second interstitial void spaces (55-1 through 55-4) descend, flow or are poured out of the solid material container (10) through the openings or dispensing channels formed while the switch valve (6) is in any of the second rotational positions other than the first rotational positions.

In a non-limiting implementation example as illustrated in FIG. 3B, each of the switch valve (6) and the container bottom (10) comprises four component shapes resembling four fan blades, and four interstitial void spaces between the four component shapes.

FIG. 3B (i) illustrates an example first rotational position of the switch valve (6) when the solid material container (10) is in the closed state (or sealed). The example first rotational position as illustrated in FIG. 3B (i) may represent one of the first rotational positions. FIG. 3B (ii) illustrates an example second rotational position of the switch valve (6) when the solid material container (10) is in a maximum open state (or not sealed). In the maximum open state, the switch valve is rotated 45 angular degrees from the first rotational position as shown in FIG. 3B (i). In the present example, at this 45 angular degrees, the openings or dispensing channels to the solid material container (10) reach the maximum sizes.

It should be noted that a wide variety of complex shapes can be used by a switch valve and/or a container bottom under techniques as described herein. For example, the switch valve and/or the container bottom may each comprise two, three, four, five, etc., component shapes resembling fan blades or the like. Additionally, optionally, or alternatively, the switch valve and/or the container bottom may each comprise a non-fan shape, an arc shape (e.g., less than 180 degrees, 180 degrees, greater than 180 degrees, etc.), a triangular shape, a trapezoidal shape, a curved shape, a regular shape, an irregular shape, a zigzag shape, a symmetric shape, a non-symmetric shape, a planar shape with smooth edges, a planar shape with non-smooth edges, etc. With different shapes, the switch valve and the container bottom may reach maximum openings or dispensing channels at 90 angular degrees, 60 angular degrees, 45 degrees, etc.

Techniques as described herein can be used to support dispensing solid materials into any of a wide variety of differently shaped, differently sized outside receptacles. For example, if the outside receptacles are of small diameter openings, a dispensing directional guide (e.g., 7 of FIG. 1A) with a correspondingly small diameter egress opening (e.g., 53 of FIG. 2D) may be used to dispense solid materials into the outside receptacles. On the other hand, if the outside receptacles are of large diameter openings and/or if the solid materials comprise relatively large diameter pellets, another dispensing directional guide (e.g., 7 of FIG. 1A) with a correspondingly large diameter egress opening (e.g., 53 of FIG. 2D) may be used to dispense solid materials into the outside receptacles. Thus, the dispensing directional guide (7) may be selected from a plurality of candidate dispensing directional guides (e.g., removably mountable onto the solid material container (10)) based on a number of factors. Example factors used to select the dispensing directional guide (7) include but are not limited to only, one or more of granularities of solid materials, sizes and/or shapes of outside receptacles, spatial arrangements of outside receptacles, etc.

In the process of storing and dispensing solid materials, some solid materials in the solid material container (10), and even some solid materials passing through the dispensing directional guide (7), may have a tendency, or may develop into one, to adhere onto interior surfaces of the storage compartments in the solid material container (10) and interior surfaces of the dispensing directional guide (7). Such a tendency may be caused by surface roughness, electrostatic charges, dampness (in solid materials from absorption of ambient moisture over time), etc. This tends to create difficulty, inefficiency, resistance, etc., in dispensing operations of the solid material dispenser (100).

In some embodiments, roughness of the interior surfaces of the storage compartments in the solid materials container (10) and/or roughness of the interior surfaces of the dispensing directional guide (7) may be kept below a certain roughness threshold in order to reduce or minimize surface adhesion of solid materials onto the interior surfaces.

Surface adhesion of solid materials in the second interstitial void spaces also can be (e.g., completely, substantially, etc.) prevented or ameliorated by rotating the switch valve (6). Surface adhesion of solid materials above the switch valve (6) can be (e.g., completely, substantially, etc.) prevented or ameliorated by using an upper surface material remover (e.g., 9 of FIG. 1A or FIG. 2I). Additionally, optionally, or alternatively, surface adhesion of solid materials in the dispensing directional guide (7) can be (e.g., completely, substantially, etc.) prevented or ameliorated by using a lower surface material remover (e.g., 8 of FIG. 1A or FIG. 2J).

Specifically, the upper surface material remover (9) and/or the lower surface material remover (8) can rotate synchronously with the central rod (6) and the switch valve (6). Rotational movements of the upper surface material remover (9) prevent or reduce adhesion of solid materials onto the interior surfaces of the storage compartments of the solid material container (10), and cause the solid materials to relatively expeditiously descend through the openings or dispensing channels into the dispensing directional guide (7). Rotational movements of the lower surface material remover (8) prevent or reduce adhesion of solid materials onto the interior surfaces of the dispensing directional guide (7), and cause the solid materials to relatively expeditiously descend through the egress opening (53) to the outside receptacles.

In some embodiments, in the dispensing operational mode, the central rod (5), the switch valve (6), upper surface materials remover (9), the lower surface material remover (8), etc., can rotate back and forth in a range of 0 to a maximum opening angular degrees such as 45 angular degrees as illustrated in FIG. 3B. Additionally, optionally, or alternatively, the central rod (5), the switch valve (6), upper surface materials remover (9), the lower surface material remover (8), etc., can rotate back and forth in a subrange (0-30 angular degrees) of angular degrees in the range (e.g., 0-45 angular degrees) of 0 to the maximum opening angular degrees.

FIG. 3C depicts example views of a drive rod (e.g., 2 of FIG. 1A) that may be used in a solid material dispenser (e.g., 100 of FIG. 1A) as described herein. In some embodiments, as illustrated in FIG. 3C, the drive rod (2) comprises one or more external flat surface sections 74.

The flat surface sections (74) can be used to determine whether the solid material container (10) of the solid material dispenser (100) is in a sealed state, as the solid material container (10) may still have solid materials stored or left over in its storage compartments at a given time. An operator and/or control unit/device/apparatus can check whether the one or more flat surface sections (74) of the drive rod (2) are parallel to one or more specific flat surfaces of the axial limit plate (1). In response to determining that the one or more flat surface sections (74) of the drive rod (2) are parallel to the one or more specific flat surfaces of the axial limit plate (1), the operator and/or control unit/device/apparatus determines that the solid material container (10) of the solid material dispenser (100) is in the closed state. This can be done when an operator/user begins, resumes or finishes using the solid material dispenser (100) for dispensing solid materials.

For example, after experiencing a fault, after a stop/pause, after finishing dispensing previous solid materials, after loading new solid materials, after a dispensing session, after a day's work, before transitioning the solid material dispenser (100) from the non-dispensing operational mode to the dispensing operational mode, etc., the operator/user can determine whether the surface sections of the drive rod (2) and the surfaces of the axial limit plate (1) are aligned properly. If not aligned, the user/operator can proceed to make sure that the solid material container (100) is properly sealed by aligning the surface sections of the drive rod (2) and the surfaces of the axial limit plate (1).

In some embodiments, the flat surface sections (74) can also be used as (e.g., initial) reference surfaces in machining processes used to cut/shape raw materials into a designated shape/profile of the drive rod (2).

The solid material dispenser (100), or any part thereof, may be made of one or more of a variety of materials. For example, the axial limit plate (1) may be made of stainless steel materials, plastic materials, or the like. One or more of the drive axial (2), the central rod (5), upper surface material remover (9), lower surface material remover (8), etc., may be made of stainless steel or the like. The compression spring (3) may be made of spring steel materials, stainless steel materials, or the like. The support structure (4) may be made of stainless steel materials, plastic materials (e.g., engineering plastics), or the like. For example, in some embodiments, engineering plastics of sufficient strength or hardness may be used for the support structure (4) as described herein. The switch valve (6) may be made of stainless steel materials, plastic materials (e.g., engineering plastics), or the like. Engineering plastics of sufficient wear-resistance, etc., may be used for a part such as the switch valve (6) as described herein. The dispensing directional guide (7) may be made of stainless steel materials, plastic materials (e.g., via plastic molding, etc.), or the like. The solid material container (10) may be made of stainless steel materials, plastic materials (e.g., engineering plastics), or the like. For example, engineering plastics of sufficient strength, hardness, wear-resistance, etc., may be used for a part such as the solid material container (10) as described herein. Additionally, optionally, or alternatively, interior surfaces of the storage compartments of the solid materials container (10) may be coated with wear-resistant materials. The container cover (11) may be made of stainless steel materials, plastic materials, or the like.

4. Example Dispensing Platform

Figure 4A:
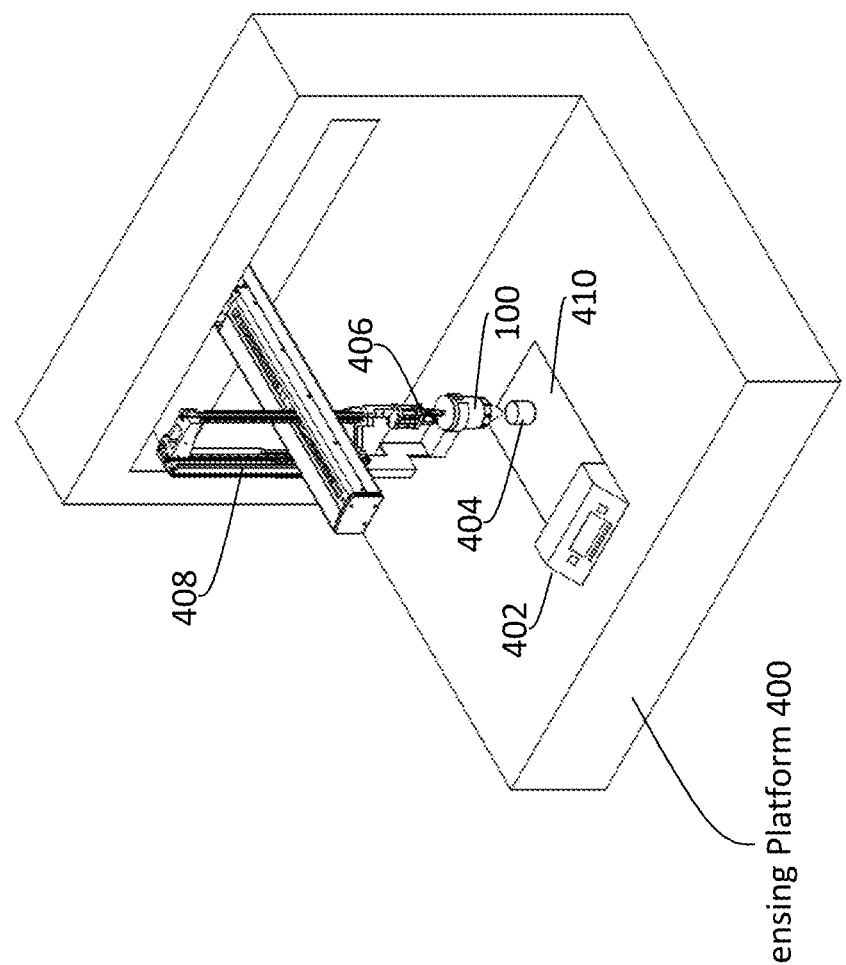
FIG. 4A and FIG. 4B illustrate an example dispensing platform.
Figure 4B:
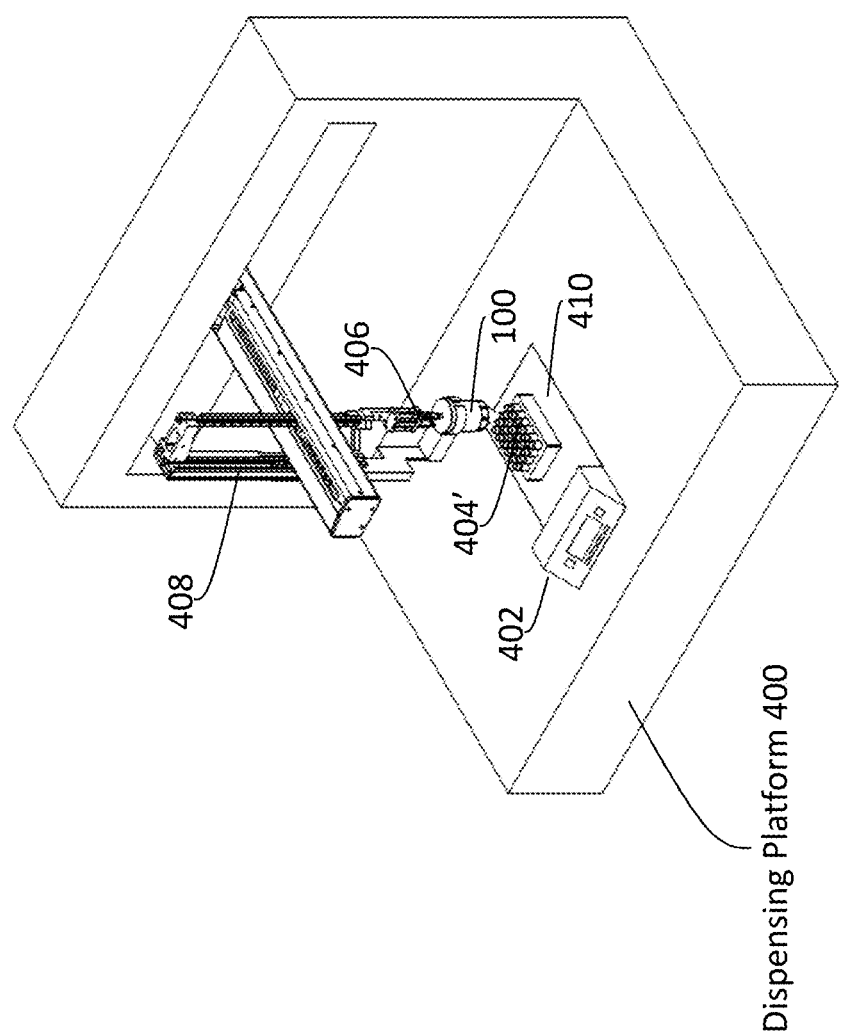

FIG. 4A and FIG. 4B illustrate an example dispensing platform 400 into which a solid material dispenser (e.g., 100 of FIG. 1A, FIG. 1B, or FIG. 1C, etc.) as described herein is integrated. As illustrated in FIG. 4A and FIG. 4B, the solid material dispenser (100) can be supported by an external support mechanism 408 of the dispensing platform (400), and can be mechanically linked to an external drive mechanism 406.

In some embodiments, the dispensing platform (400) comprises a dispensing control subsystem 402 that is implemented at least in part by one or more computing devices. The dispensing control subsystem (402) is implemented at least in part in hardware to control dispensing operational modes of the solid material dispenser (100), control dispensing operations of the solid material dispenser (100), control corresponding operations of the external support mechanism (408) and the external drive mechanism (406), etc.

For example, the dispensing control subsystem (402) can control the external support mechanism (408) such as mechanic arms, etc., to move/position over the solid material dispenser (100), and aligned the egress opening (53) of the solid material dispenser (100) with an opening of, a solid material receptacle 404.

The dispensing control subsystem (402) can cause the solid material container (2) to transition from the (e.g., initial, intermittent) non-dispensing operational mode to the dispensing operational mode, or vice versa. A first transition from the non-dispensing operational mode to the dispensing operational mode may be caused by the dispensing control subsystem (402) by using the external drive mechanism (406) such as an external drive shaft, etc., to move the drive rod (2) of the solid material dispenser (100) linearly down along the axis direction (12) to disengage from the axial limit plate (1) and rotate the drive rod (2) from one of the first rotational positions to one of the second rotational positions. A second transition from the dispensing operational mode to the (e.g., intermittent, final) non-dispensing operational mode may be caused by the dispensing control subsystem (402) by using the external drive mechanism (406) such as an external drive shaft, etc., to rotate the drive rod (2) from one of the second rotational positions to one of the first rotational positions and move the drive rod (2) of the solid material dispenser (100) linearly up along the axis direction (12) to engage from the axial limit plate (1).

In some embodiments, the dispensing platform (400) is integrated with a (e.g., digital, electronic or the like) weight scale 410. The dispensing control subsystem (402) receives weight measurements from the weight scale (410) as to whether a designated solid material receptacle such as 404 of FIG. 4A, a designated solid material receptacle in a solid material receptacle array (404') of FIG. 4B, etc., is filled (or is about to be filled by a trail amount) with a designated amount of solid materials from the solid material container (200). The trail amount may represent an amount that is to be dispensed during a time interval the solid material container (100) is being switched from the dispensing operational mode to the non-dispensing operational mode.

In response to receiving the weight measurements that the designated solid material receptacle is filled (or is about to be filled by a trail amount) with the designated amount of solid materials from the solid material container (200), the dispensing control subsystem (402) causes the solid material container (100) to transition from the dispensing operational mode to the non-dispensing operational mode. In some embodiments, additionally, optionally, or alternatively, the dispensing control subsystem (402) causes the solid material container (100) to reposition the solid material container (100) over another receptacle such as another receptacle in the solid material receptacle array (404'), and start dispensing operations for the other receptacle in the solid material receptacle array (404').

As used herein, the term "solid material" refers to simple or complex materials (e.g., small molecule materials, large molecule materials, chemical compounds, pharmaceutical ingredients/materials, etc.) made of individually distinct parts each of which exhibits rigidity and has a three dimensional contiguous shape, ranging from solid particles/dots at nanometer scales, to finely grinded powder, to grits/pellets of diameters of up to tens of millimeters or even larger, etc. Examples of solid materials may include, but are not necessarily limited to only, any of: solid state materials, non-solid state materials (e.g., amorphous materials, etc.), powders, pellets, solid particles, quantum dots, etc.

In some embodiments, an individually distinct part (e.g., a single solid particle, a single powder element, a single pellet, etc.) of solid material(s) may be measured by the size (e.g., diameter, width, height, thickness, a combination of any of the foregoing, etc.) of an imaginary sphere, cube, etc., that minimally encloses/encompass the individual solid material part. In some embodiments, solid materials to be dispensed under techniques as described herein may be of sizes within a specific range of sizes or granularity levels. The specific range can be selected based at least in part on specific dispensing applications.

Example ranges of sizes or granularity levels of solid materials to be dispensed by a solid material dispenser (e.g., 100 of FIG. 1A, etc.) as described herein may include, but are not limited to, any of: nanometer sizes, tens of nanometer sizes, fractional micrometer sizes, micrometer sizes, tenth millimeter sizes, fractional millimeter sizes, millimeter sizes, greater than three-millimeter sizes, greater than five-millimeter sizes, ten-millimeter sizes, greater than ten-millimeter sizes, etc.

In some dispensing applications, a relatively narrow (or uniform) range of size(s) or granularity level(s) in solid materials may be used and maintained. A relatively uniform size or granularity level in solid materials may be used and maintained.

In some other dispensing applications, less uniform size(s) or granularity level(s) in solid materials may be used and maintained. In such dispensing applications, (e.g., large, small, etc.) variability of size(s) or granularity level(s) in solid materials may be tolerated or supported; solid materials within a relatively wide range of size(s) or granularity level(s) may be dispensed.

In some embodiments, solid materials as described herein may refer to dry materials of little or no liquid. In some embodiments, solid materials as described herein may refer to materials within a specific range of dryness. Example ranges of dryness may include, but are not limited to, any of: 100% to 99.9% free of moisture or water, 100% to 99% free of moisture or water, 100% to 98% free of moisture or water, 100% to 95% free of moisture or water, etc. A specific range of dryness of solid materials used in a specific dispensing application may be selected based at least in part on a particular type of the specific dispensing application. For example, in some (or some types of) dispensing applications, a relatively high degree of dryness in solid materials may be used and maintained, whereas in some other (or some other types of) dispensing applications, a lower degree of dryness in solid materials may be used and maintained. In some dispensing applications, variability of dryness in solid materials may be tolerated or supported; for example, a relatively wide range (e.g., caused by solid material clumping together, caused by absorption of ambient moisture, caused by accumulated static electric charges, etc.) of dryness in solid materials may be used in a single (or a single type of) dispensing application.

A dispensing platform, or a dispensing control subsystem therein, can control uniformity or non-uniformity of solid materials dispensed by a solid material dispenser (e.g., 100 of FIG. 1A, etc.) as described herein to an outside receptacle by controlling one or more configurational and/or operational parameters related to dispensing operations. These configurational and/or operational parameters may include, but are not limited to only, any of: input sizes of the solid materials stored into the solid material container (10), sizes of meshes (if any) of the upper surface material remover (9), sizes of meshes (if any) of the lower surface material remover (8), susceptibility of the solid materials to form clumps, susceptibility of the solid materials to absorb moisture over time, susceptibility of the solid materials to accumulate static electric charges, sizes of the openings or dispensing channels formed by formed by the switch valve (6) and the container bottom (19), the size of the egress opening (53) of the dispensing directional guide (7), etc.

For example, the smaller the openings or dispensing channels formed by the switch valve (6) and the container bottom (19), the finer in sizes the solid materials can be dispensed. The larger the openings or dispensing channels formed by the switch valve (6) and the container bottom (19), the larger (or the greater diversity) in sizes the solid materials can be dispensed. The finer in sizes the meshes of the upper surface material remover (9) and/or the lower surface material remover (8), the finer in sizes the solid materials can be dispensed. Additionally, optionally, or alternatively, the larger in sizes the meshes of the upper surface material remover (9) and/or the lower surface material remover (8), the larger (or the greater diversity) in sizes the solid materials can be dispensed.

In some embodiments, in addition to, or in place of, using the upper surface material remover (9) and/or the lower surface material remover (8) to prevent solid materials to be attracted to interior surfaces of the solid material container (10) and/or the dispensing directional guide (7), the solid material container (10) may be cause to shake, for example, by mechanic arms (robotic arms) mechanically coupled to the solid material container (10) or the solid material dispenser (100). The shaking of the solid material container (10) or the solid material dispenser (100) may be one or more of up and down motions, side by side motions, etc., so long as these motions do not affect solid materials to be dispensed into designated outside receptacle(s).

A dispensing platform, or a dispensing control subsystem therein, can control a solid material dispensing rate (or speed) that measures the speed of solid materials being dispensed by a solid material dispenser (e.g., 100 of FIG. 1A, etc.) as described herein to an outside receptacle by controlling one or more configurational and/or operational parameters related to dispensing operations. These configurational and/or operational parameters may include, but are not limited to only, any of: frictions between individually distinct parts of solid materials, weights and/or sizes of individually distinct parts of solid materials, physical properties (e.g., roughness, material types such as stainless steel, glass, plastics, etc.) of materials used to make the storage chambers of the solid material container (10) and/or the dispensing directional guide (7), the rotational angle of the switch valve (6), the rotational speed of the switch valve (6), sizes of the first interstitial void spaces (e.g., 58-1 through 58-4) related to the container bottom (19) of the solid material container (10), sizes of the second interstitial void spaces (e.g., 58-1 through 58-4) related to the switch valve (6), dryness of the solid materials to be dispensed, the size of the egress opening (53) of the dispensing directional guide (7), etc. For example, the greater the openings or dispensing channels formed by the switch valve (6) and the container bottom (19), the greater the dispensing rate is. Additionally, optionally, or alternatively, the longer the openings or dispensing channels formed by the switch valve (6) and the container bottom (19) exist, the greater the dispensing rate is.

In some embodiments, in the dispensing operational mode, the drive rod (2), the central rod (5), the switch valve (6), etc., can be constantly in rotational motion. For example, the dispensing operational mode, the drive rod (2), the central rod (5), the switch valve (6), etc., may repeatedly make rotations between a certain angular range such as between 0 and 45 degrees, etc., while the solid material dispenser (100) conducts dispensing operations.

In some embodiments, in the dispensing operational mode, the drive rod (2), the central rod (5), the switch valve (6), etc., can be stationary for some or all of the time in that operational mode. For example, the dispensing operational mode, the drive rod (2), the central rod (5), the switch valve (6), etc., may make an initial rotation to form the openings or dispensing channels; thereafter, dispensing operational mode, the drive rod (2), the central rod (5), the switch valve (6), etc., may stay stationary in that position while the solid material dispenser (100) conducts dispensing operations.

5. Example Embodiments

In some embodiments, a device for solid material dispensing comprises a drive rod (2) linearly movable along, and rotationally movable around, an axis direction (12); a central rod (5) attached to the drive rod and drivable by the drive rod to rotate around the axis direction with the drive rod; a solid material container (10) having one or more compartments to store solid materials to be dispensed; a switch valve (6) rigidly attached to the central rod and drivable by the central rod to rotate around the axis direction with the central rod. A container bottom (19) of the solid material container comprises one or more first component shapes (57) that form one or more first interstitial void spaces. The switch valve comprises one or more second component shapes (54) that form one or more second interstitial void spaces (55). The one or more second component shapes of the switch valve form a closure with the one or more first component shapes of the container bottom of the solid material container to prevent any of the solid material from being dispensed from the solid material container while the switch valve is positioned at one or more first rotational positions. The one or more second interstitial void spaces form one or more dispensing channels with the one or more first interstitial void spaces to allow one or more units of the solid material to be dispensed from the solid material container to one or more outside receptacles while the switch valve is rotationally positioned differently from the one or more first rotational positions.

In an embodiment, the device further comprises one or more of: a dispensing directional guide (7) comprising an ingress opening to receive the one or more units of the solid materials through the one or more dispensing channels and an egress opening to dispense the one or more units of the drive materials; an axial limit plate (1) to make physical contact with the drive rod, to prevent the drive rod from axial drifting, and to stop the drive rod from being rotated while the drive rod is at a first linear position along the axis direction; a compression spring (3) inserted between the drive rod and the central rod, the compression spring having an upper end that is linearly movable with the drive rod; a support structure (4) secured to the solid material container; an upper surface material remover (9) movable relative to one or more first interior surfaces of the one or more compartments of the solid material container; a lower surface material remover (8) movable relative to one or more second interior surfaces formed between the ingress and egress openings of the dispensing directional guide; a container cover (11) removably secured to the solid material container; etc.

In an embodiment, the drive shaft is driven by an external drive mechanism to make a rotational movement around the axis direction; the drive shaft transmits the rotational movement to the central rod; and the central rod further transmits the rotational movement to the switch valve.

In an embodiment, the drive shaft comprises at least one planar surface which, when aligned with one or more specific edges of an axial limit plate, indicates that the solid material container is sealed.

In an embodiment, the solid materials comprise one or more of: solid state materials, non-solid state materials, amorphous materials, powders, grits, pellets, solid particles, quantum dots, simple materials, complex materials, small molecule materials, large molecule materials, chemical compounds, pharmaceutical ingredients, or pharmaceutical related materials.

In an embodiment, a dispensing directional guide is removably secured onto the solid material container.

In an embodiment, the dispensing directional guide is selected, based on a size of an outside receptacle in use, from among a plurality of dispensing directional guides that support dispensing operations to different sizes of outside receptacles.

In an embodiment, the central shaft and the drive shaft are laterally supported with a support structure mounted on the solid material container. In an embodiment, the support structure comprises a rotational movement constraint.

In an embodiment, an upper surface material remover is secured to, and is driven to rotate in synchronization with, the central rod to prevent solid materials from adhering to one or more interior surface portions of the solid material container.

In an embodiment, a lower surface material remover is secured to, and is driven to rotate in synchronization with, the central rod to prevent solid materials from adhering to one or more interior surface portions of a dispensing directional guide used to guide solid materials from the solid material container to an outside receptacle.

In an embodiment, a lower surface material remover is secured to, and is driven to rotate in synchronization with, the central rod to prevent solid materials from adhering to one or more interior surface portions of a dispensing directional guide used to guide solid materials from the solid material container to an outside receptacle.

Embodiments include a method of using a device as described herein to dispense one or more types of solid materials to one or more outside receptacles.

Embodiments include a dispensing platform that comprises a device as described herein for dispensing one or more types of solid materials to one or more outside receptacles.

In an embodiment, the dispensing platform further comprises a dispensing control subsystem to control one or more dispensing operations of the device.

In an embodiment, the dispensing platform further comprises a mechanic arm to which the device is secured.

In an embodiment, the dispensing platform further comprises an external drive to cause the drive shaft of the device to linearly move away from axial limit plate that is configured to prevent axial drifting in a non-dispensing operational mode.

In an embodiment, the dispensing platform further comprises an external drive to cause the drive shaft of the device to rotate between one of the one or more first rotational positions and a rotational position other than the one or more first rotational positions.

In an embodiment, the dispensing platform further comprises a weight scale that measures how much solid materials have been dispensed into an outside receptacle.

Note that, although separate embodiments are discussed herein, any combination of embodiments and/or partial embodiments discussed herein may be combined to form further embodiments.

6. Implementation Mechanisms-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
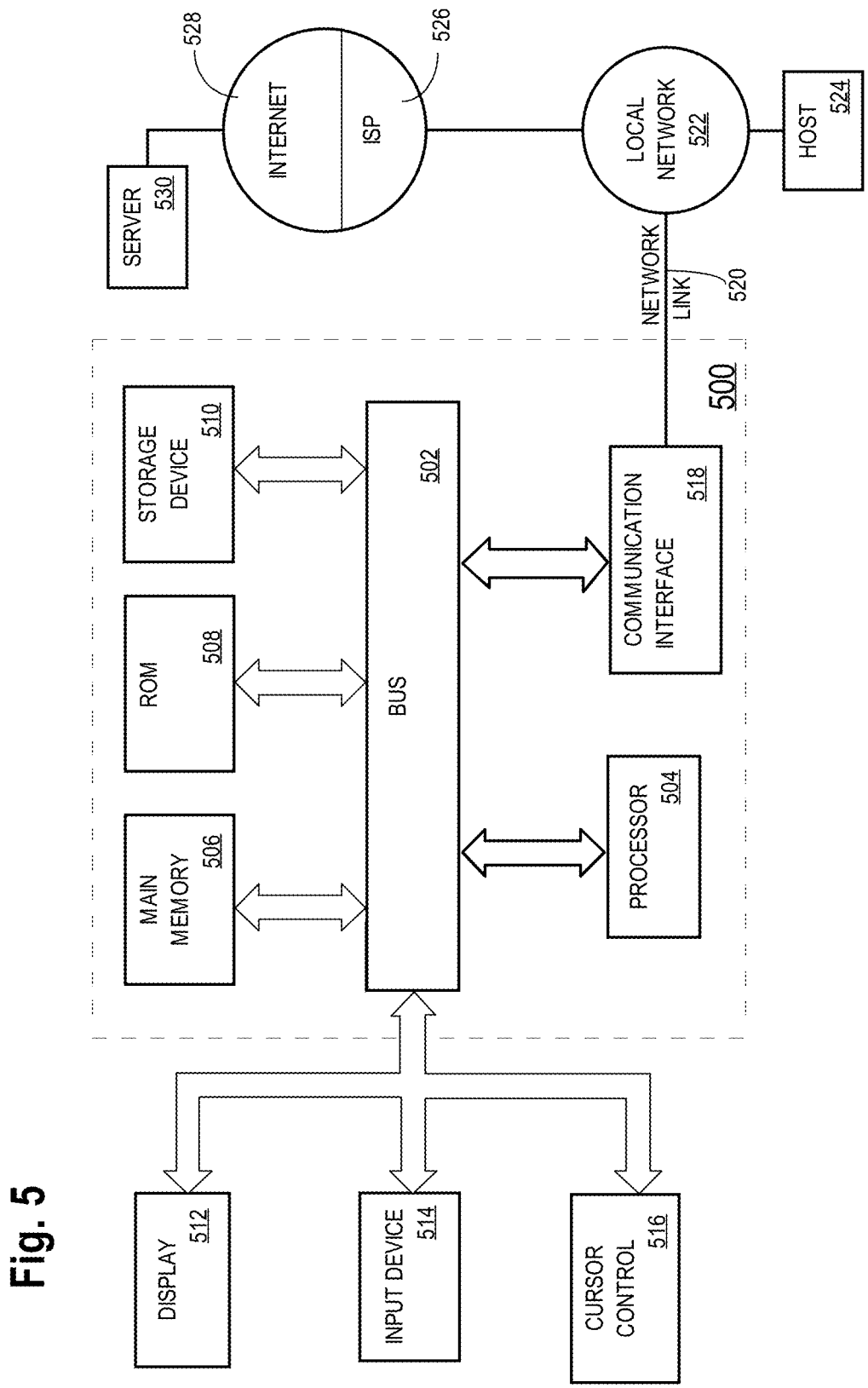
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A device for solid material dispensing, comprising:
 a drive rod (2) linearly movable along, and rotationally movable around, an axis direction (12);
 wherein the drive rod is linearly movable to a first linear position at which the drive rod is in physical contact with an axis limit plate (1) and to a second linear position at which the drive rod is not in physical contact with the axis limit plate, along the axis direction around which the drive rod is rotationally movable;

wherein an upper portion of the drive rod goes through, and stays above, an opening of the axial limit plate in a non-dispensing operational mode;
wherein, in a dispensing operational mode, a downward force is exerted on the drive rod by an external drive shaft of a motor operationally coupled with the upper portion of the drive rod to cause the drive rod to be displaced downward along the axis direction and to be physically disengaged from the axial limit plate;
a central rod (5) attached to the drive rod and drivable by the drive rod to rotate around the axis direction with the drive rod;
a solid material container (10) having one or more compartments to store solid materials to be dispensed;
a surface material remover (9) attached to the central rod and movable relative to one or more first interior surfaces of the one or more compartments of the solid material container in the dispensing operational mode, wherein the surface material remover is in a shape of a rectangle;
a switch valve (6) rigidly attached to the central rod and drivable by the central rod to rotate around the axis direction with the central rod;
wherein a container bottom (19) of the solid material container comprises one or more first component shapes (57) that form one or more first interstitial void spaces (58);
wherein the switch valve comprises one or more second component shapes (54) that form one or more second interstitial void spaces (55);
wherein the one or more second component shapes of the switch valve form a closure with the one or more first component shapes of the container bottom of the solid material container to prevent any of the solid material from being dispensed from the solid material container while the switch valve is positioned at one or more first rotational positions;
wherein the one or more second interstitial void spaces form one or more dispensing channels with the one or more first interstitial void spaces to allow one or more units of the solid material to be dispensed from the solid material container to one or more outside receptacles while the switch valve is rotationally positioned differently from the one or more first rotational positions.

2. The device of claim 1, further comprising one or more of:
a dispensing directional guide (7) comprising an ingress opening to receive the one or more units of the solid materials through the one or more dispensing channels and an egress opening to dispense the one or more units of the drive materials;
wherein the axial limit plate makes physical contact with the drive rod in the non-dispensing operational mode, to prevent the drive rod from axial drifting, and to stop the drive rod from being rotated while the drive rod is at a first linear position along the axis direction;
a compression spring (3) inserted between the drive rod and the central rod, the compression spring having an upper end that is linearly movable with the drive rod;
a support structure (4) secured to the solid material container;
wherein the surface material remover represents an upper surface material remover;
a lower surface material remover (8) movable relative to one or more second interior surfaces formed between the ingress and egress openings of the dispensing directional guide; or
a container cover (11) removably secured to the solid material container.

3. The device of claim 1, wherein the drive shaft is driven by an external drive mechanism to make a rotational movement around the axis direction, wherein the drive shaft transmits the rotational movement to the central rod, and wherein the central rod further transmits the rotational movement to the switch valve.

4. The device of claim 1, wherein the drive shaft comprises at least one planar surface which, when aligned with one or more specific edges of an axial limit plate, indicates that the solid material container is sealed.

5. The device of claim 1, wherein the solid materials comprise one or more of: solid state materials, non-solid state materials, amorphous materials, powders, grits, pellets, solid particles, quantum dots, simple materials, complex materials, small molecule materials, large molecule materials, chemical compounds, pharmaceutical ingredients, or pharmaceutical related materials.

6. The device of claim 1, wherein a dispensing directional guide is removably secured onto the solid material container.

7. The device of claim 6, wherein the dispensing directional guide is selected, based on a size of an outside receptacle in use, from among a plurality of dispensing directional guides that support dispensing operations to different sizes of outside receptacles.

8. The device of claim 1, wherein the central shaft and the drive shaft are laterally supported with a support structure mounted on the solid material container.

9. The device of claim 8, wherein the support structure comprises a rotational movement constraint.

10. The device of claim 1, wherein the surface material remover is secured to, and is driven to rotate in synchronization with, the central rod to prevent solid materials from adhering to one or more interior surface portions of the solid material container.

11. The device of claim 1, wherein a lower surface material remover is secured to, and is driven to rotate in synchronization with, the central rod to prevent solid materials from adhering to one or more interior surface portions of a dispensing directional guide used to guide solid materials from the solid material container to an outside receptacle.

12. The device of claim 1, wherein a lower surface material remover is secured to, and is driven to rotate in synchronization with, the central rod to prevent solid materials from adhering to one or more interior surface portions of a dispensing directional guide used to guide solid materials from the solid material container to an outside receptacle.

13. A method of using a device as recited in claim 1 to dispense one or more types of solid materials to one or more outside receptacles.

14. A method of using a device as recited in claim 2 to dispense one or more types of solid materials to one or more outside receptacles.

15. A dispensing platform that comprises a device as recited in claim 1 for dispensing one or more types of solid materials to one or more outside receptacles.

16. The dispensing platform of claim 15, further comprising a dispensing control subsystem to control one or more dispensing operations of the device.

17. The dispensing platform of claim 15, further comprising a mechanic arm to which the device is secured.

18. The dispensing platform of claim 15, further comprising an external drive to cause the drive shaft of the device to linearly move away from axial limit plate that is configured to prevent axial drifting in the non-dispensing operational mode.

19. The dispensing platform of claim 15, further comprising an external drive to cause the drive shaft of the device to rotate between one of the one or more first rotational positions and a rotational position other than the one or more first rotational positions.

20. The dispensing platform of claim 15, further comprising a weight scale that measures how much solid materials have been dispensed into an outside receptacle.

* * * * *